United States Patent [19]

Bayliss et al.

[11] 4,407,016
[45] Sep. 27, 1983

[54] MICROPROCESSOR PROVIDING AN INTERFACE BETWEEN A PERIPHERAL SUBSYSTEM AND AN OBJECT-ORIENTED DATA PROCESSOR

[75] Inventors: John A. Bayliss; Craig B. Peterson, both of Portland; Doran K. Wilde, Aloha, all of Oreg.

[73] Assignee: Intel Corporation, Santa Clara, Calif.

[21] Appl. No.: 235,470

[22] Filed: Feb. 18, 1981

[51] Int. Cl.³ .............................................. G06F 9/20
[52] U.S. Cl. .................................................. 364/200
[58] Field of Search .............................. 364/200, 900

[56] References Cited

U.S. PATENT DOCUMENTS

| | | | |
|---|---|---|---|
| 4,126,894 | 11/1978 | Cronshaw et al. | 364/200 |
| 4,145,738 | 3/1979 | Inoue | 364/200 |
| 4,173,783 | 11/1979 | Couleur et al. | 364/200 |
| 4,231,086 | 10/1980 | Tarbox et al. | 364/200 |
| 4,332,008 | 5/1982 | Shima et al. | 364/200 |

Primary Examiner—Felix D. Gruber
Assistant Examiner—D. H. Rutherford
Attorney, Agent, or Firm—Owen L. Lamb

[57] ABSTRACT

A microprocessor receives addresses and data from a peripheral subsystem for use in subsequently accessing portions of the main memory of a data processing system in a controlled and protected manner. Each of the addresses is used to interrogate an associative memory to determine if the address falls within one of the subranges for a "window" on the main memory address space. If the address matches, then it is used to develop a corresponding address on the main memory address space. The data associated with the peripheral subsystem address is then passed through the interface and into the main memory at the translated memory address. Data transfer is improved by buffering blocks of data on the microprocessor. Data bytes are written into the buffer at a slower rate than data blocks are read out of the buffer and into main memory. A buffer bypass register allows single bytes of data to be transferred to a single address by bypassing the buffer. Address development and memory response signals are generated by the microprocessor rather than the peripheral subsystem processor for block transfers.

14 Claims, 19 Drawing Figures

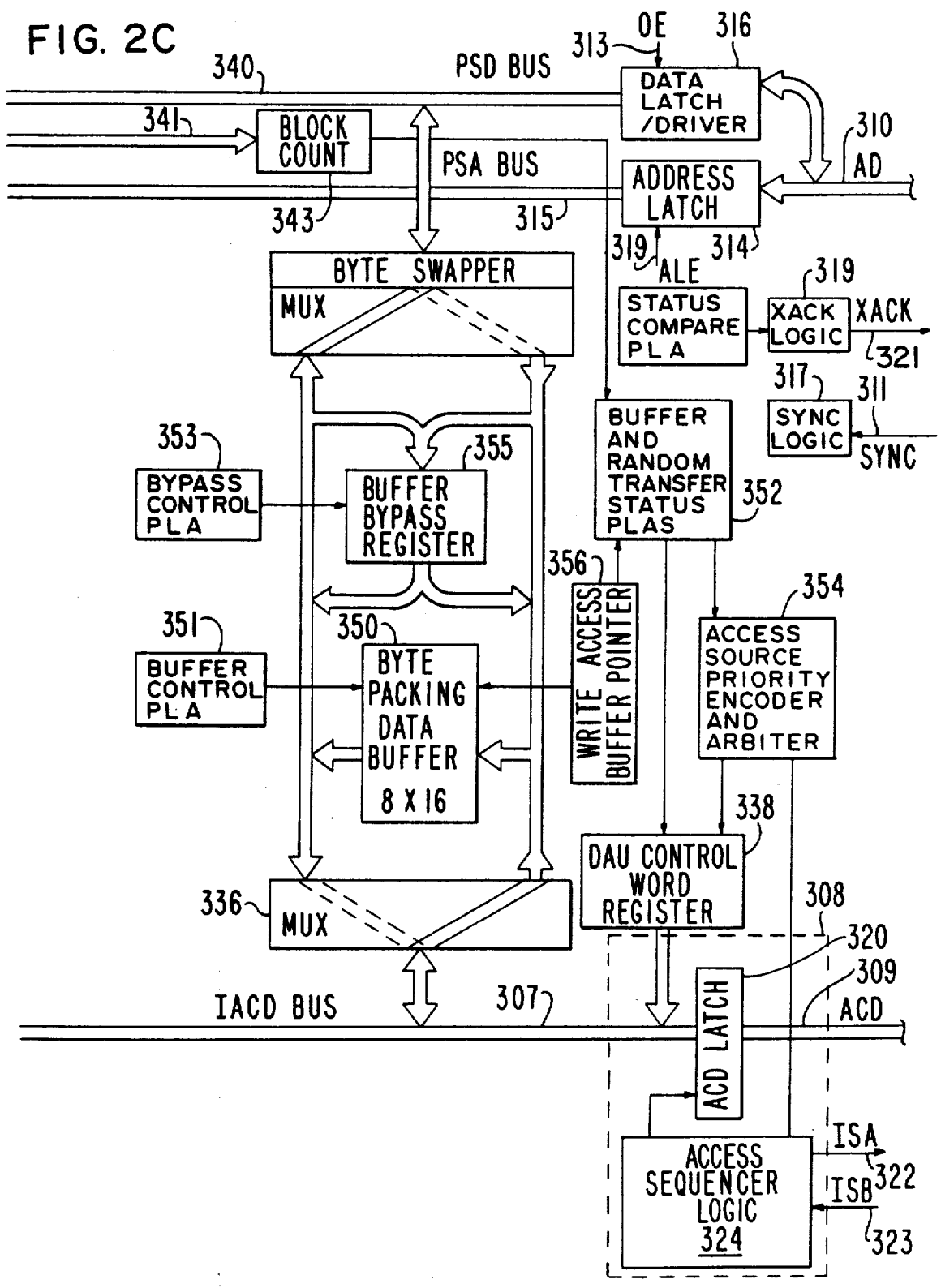

FIG. 3
8803 INTERNAL CLOCK TIMING
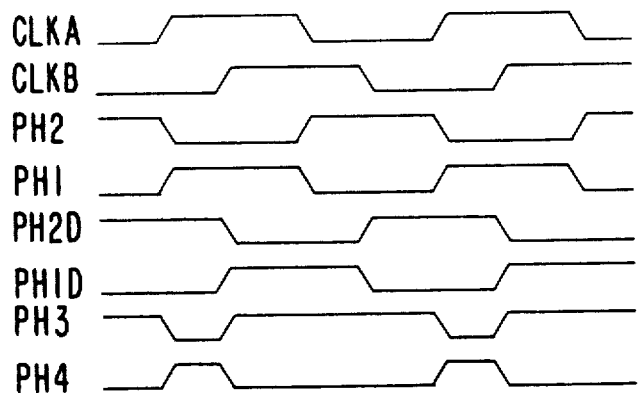
MICROINSTRUCTION ROM TIMING CLOCKS
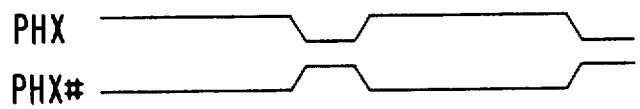
FIG. 4
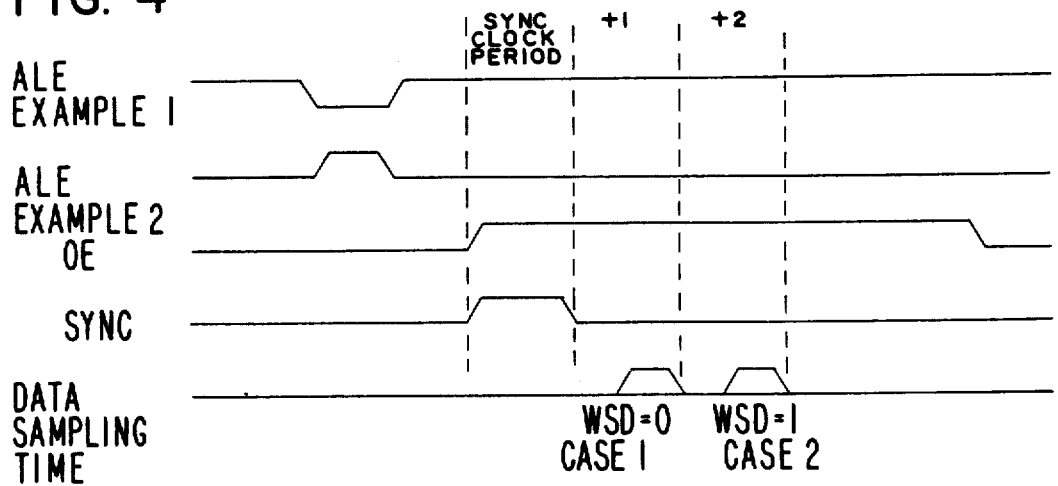

FIG. 8

| TWO FIFO REGISTERS | CASE 1 | | CASE 2 | | CASE 3 | | |
|---|---|---|---|---|---|---|---|
| | XXXX | XXXX | XXXX | XXXX | XXXX | XXXX | ODDWRITE=0 |
| | ---- | ---- | ---- | ---- | ---- | ---- | POINTER |
| INPUT DATA | ---- | LLLL | UUUU | ---- | UUUU | LLLL | |

| THREE FIFO REGISTERS | CASE 4 | | CASE 5 | | CASE 6 | | |
|---|---|---|---|---|---|---|---|
| | XXXX | XXXX | XXXX | XXXX | XXXX | XXXX | ODDWRITE=1 |
| | ---- | XXXX | ---- | XXXX | ---- | XXXX | POINTER |
| | ---- | ---- | ---- | ---- | ---- | ---- | |
| INPUT DATA | ---- | LLLL | UUUU | ---- | UUUU | LLLL | |

SYMBOL DEFINITIONS:
- XXXX  A FILLED FIFO BYTE LOCATION
- ----  AN EMPTY BYTE LOCATION
- UUUU  UPPER BYTE OF INPUT DATA
- LLLL  LOWER BYTE OF INPUT DATA

FIG. 9

| | CASE 1 | | CASE 2 | | CASE 3 | | |
|---|---|---|---|---|---|---|---|
| REQUESTED OUTPUT | ---- | LLLL | UUUU | ---- | UUUU | LLLL | |
| TOP OF FIFO | XXXX | XXXX | XXXX | XXXX | XXXX | XXXX | ODDREAD=0 |

| | CASE 4 | | CASE 5 | | CASE 6 | | |
|---|---|---|---|---|---|---|---|
| REQUESTED OUTPUT | ---- | LLLL | UUUU | ---- | UUUU | LLLL | |
| TOP OF FIFO | XXXX | ---- | XXXX | ---- | XXXX | ---- | ODDREAD=1 |
| TOP-1 OF FIFO | XXXX | XXXX | XXXX | XXXX | XXXX | XXXX | |

| | CASE 7 | | CASE 8 | | |
|---|---|---|---|---|---|
| REQUESTED OUTPUT | ---- | LLLL | UUUU | ---- | |
| TOP OF FIFO | ---- | XXXX | ---- | XXXX | ODDREAD=0 |
| TOP-1 OF FIFO | ---- | ---- | ---- | ---- | |

SYMBOL DEFINITIONS:
- XXXX  A FILLED FIFO BYTE LOCATION
- ----  AN EMPTY BYTE LOCATION
- UUUU  DATA IS REQUESTED ON THE UPPER BYTE POSITION
- LLLL  DATA IS REQUESTED ON THE LOWER BYTE POSITION

RIGHTS

| 0 | 0 | 0 | 0 | 0 | 0 | 0 | 0 | 0 | 0 | 0 | WR | RR | 0 | 0 |

READ RIGHTS
WRITE RIGHTS

ADDRESS LOW

| AL | AL | AL | AL | AL | AL | AL | AL | 0 | AD | 0 | 0 | 0 | 0 | 0 |

├─ADDRESS LOW─┤   ─ALTERED

ADDRESS HIGH

| AH | AH | AH | AH | AH | AH | AH | AH | AH | AH | AH | AH | AH | AH | AH | AH |

├────── ADDRESS HIGH ──────┤

LENGTH

| LE | LE | LE | LE | LE | LE | LE | LE | LE | LE | LE | LE | LE | LE | LE | LE |

├────── LENGTH ──────┤

FIG. 14
MICROINSTRUCTION FAULT REGISTER
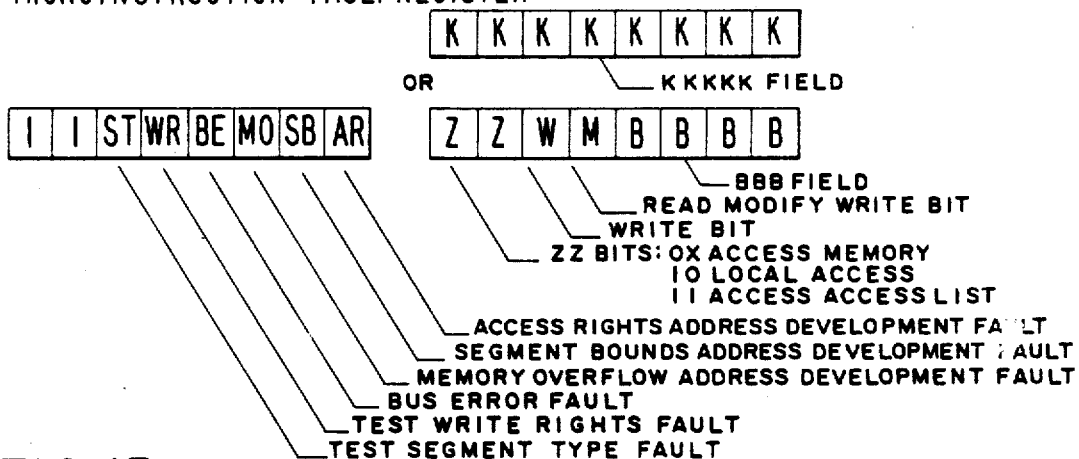
FIG. 15
WINDOW ACCESS FAULT REGISTER
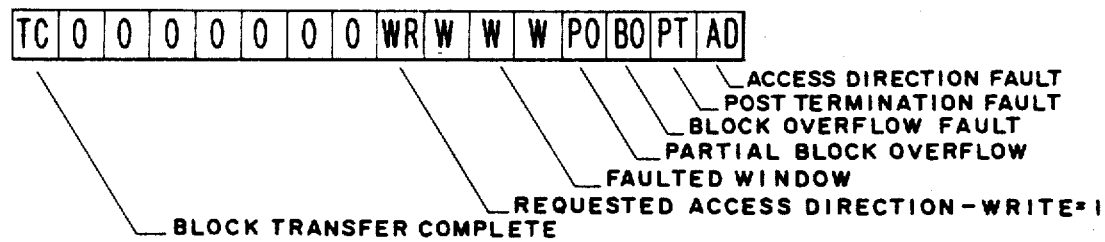
MAP FACILITY ADDRESS DEVELOPMENT FAULT REGISTER
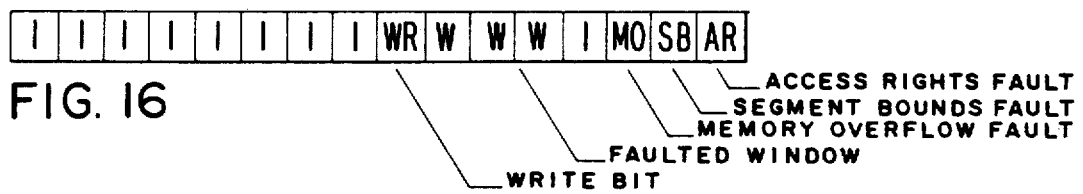
FIG. 16
MAP FACILITY BUS ERROR REGISTER 1
MAP FACILITY BUS ERROR REGISTER 2
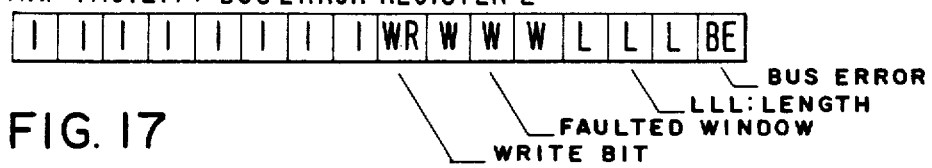
FIG. 17

MICROPROCESSOR PROVIDING AN INTERFACE BETWEEN A PERIPHERAL SUBSYSTEM AND AN OBJECT-ORIENTED DATA PROCESSOR

TECHNICAL FIELD

The present invention relates to data processing systems, and more particularly, to an improved microprocessor providing an interface which allows a peripheral subsystem to access portions of the main memory of a data processing system in a controlled and protected manner by means of address-mapping facilities.

BACKGROUND ART

In U.S. Pat. No. 4,325,120 of Stephen R. Colley, et al. entitled "Data Processing System," granted Apr. 13, 1982, there is disclosed an object-oriented data processor architecture which takes full advantage of recent advances in the state-of-the-art of very large-scale, integrated-circuit technology. That patent application describes a general-purpose data processor (GDP) which is able to perform generalized computation over a wide spectrum of data types supported by the architecture. There is a need to provide an interface between a peripheral subsystem environment (for example, a processor such as an Intel 8085 or 8086, local memory, and a local bus, such as an Intel Multibus or a processor bus) and the GDP system's protected main memory environment. The architecture of such an interface is described in U.S. Pat. No. 4,315,310 of John Bayliss, et al. entitled "Input/Output Data Processing System," granted Feb. 9, 1982. The input/output data processing system described therein provides an interface by which an attached processor is connected to the main data processing system. It includes means for addressing the main memory as well as means for providing function compatibility with the GDP system's object-oriented architecture. The interface is able to recognize addresses generated by the attached processor, and map these addresses onto the address space of GDP main memory. The interface also allows the attached processor to communicate with processes and processors within the data processing system.

Because of its role as an interface between the main memory space and the peripheral subsystem, the data transfer rate between the two systems should be optimized. Not only should the data rate by optimized, there must be provided means to support the execution of microinstructions from the peripheral subsystem in order to implement a function-request facility which provides a functional capability over certain objects within the main processor's address space.

Since address translation necessarily takes a certain amount of time, it would be inefficient to go through an address translation for each byte or word of data to be transferred from the peripheral subsystem to the main memory.

It is therefore a primary object of the present invention to provide an improved microprocessor which establishes an interface to enable a peripheral subsystem to access portions of the main memory of a data processing system in a controlled and protected manner, by means of address-mapping facilities, whereby data blocks may be transferred without going through an address translation for each one of the bytes or words comprising a data block.

BRIEF SUMMARY OF THE INVENTION

Briefly, the microprocessor receives addresses and data from the peripheral subsystem. Each of the addresses is used to interrogate an associative memory to determine if the address falls within one of the sub-ranges for a "window" on the main memory address space. If the address matches, then the address is used to develop a corresponding address on the main memory address space. The data associated with the peripheral subsystem address is then passed through the interface and into the main memory at the translated memory address. When the main memory responds, indicating that it has received the data, the interface logic signals the peripheral subsystem for the next item of data. Data transfer is improved by avoiding this lengthy sequence of operations for each piece of data by buffering blocks of data on the microprocessor. Logic and clocking mechanisms allow the peripheral subsystem to write data into the buffer at a slower rate than the data is read out of the buffer and into the main memory. Thus, several bytes of data may be written into the buffer at a slow rate, whereas a block of data may be written out of the buffer at a high data rate. Single bytes of data may be transferred to a single address by bypassing the buffer. This is accomplished by providing a buffer bypass register and allowing the microprocessor to operate in two modes, a random-access mode wherein the buffer is bypassed, and a block-transfer mode wherein the buffer is utilized. Address development and memory response signals are generated by the microprocessor rather than the peripheral subsystem processor for block transfers when the microprocessor is in the buffered mode.

Description of the Drawings

FIGS. 2A, 2B, and 2C, taken together as a composite, are a block diagram of the various logic circuits comprising the microprocessor in which the invention is embodied;

FIG. 3 is a timing diagram of the internal clock of the microprocessor in which the invention is embodied;

FIG. 4 is a timing diagram showing the relationship between the ALE, OE, and SYNC lines;

FIG. 8 is a diagram of the window buffer contents for byte packing cases;

FIG. 9 is a diagram of the window buffer contents for read cases;

FIG. 14 is a diagram of the contents of the microinstruction fault register;

FIG. 15 is a diagram of the contents of the window access fault register;

FIG. 16 is a diagram of the contents of the map facility address development fault register; and, FIG. 17 is a diagram of the contents of the map facility bus error fault registers 1 and 2.

TABLE OF CONTENTS

Technical Field
Background Art
Brief Summary of the Invention
Brief Description of the Drawings
Table of Contents
Introductory Description of the Invention
Detailed Description

Introductory Description of the Invention

Figure 1:
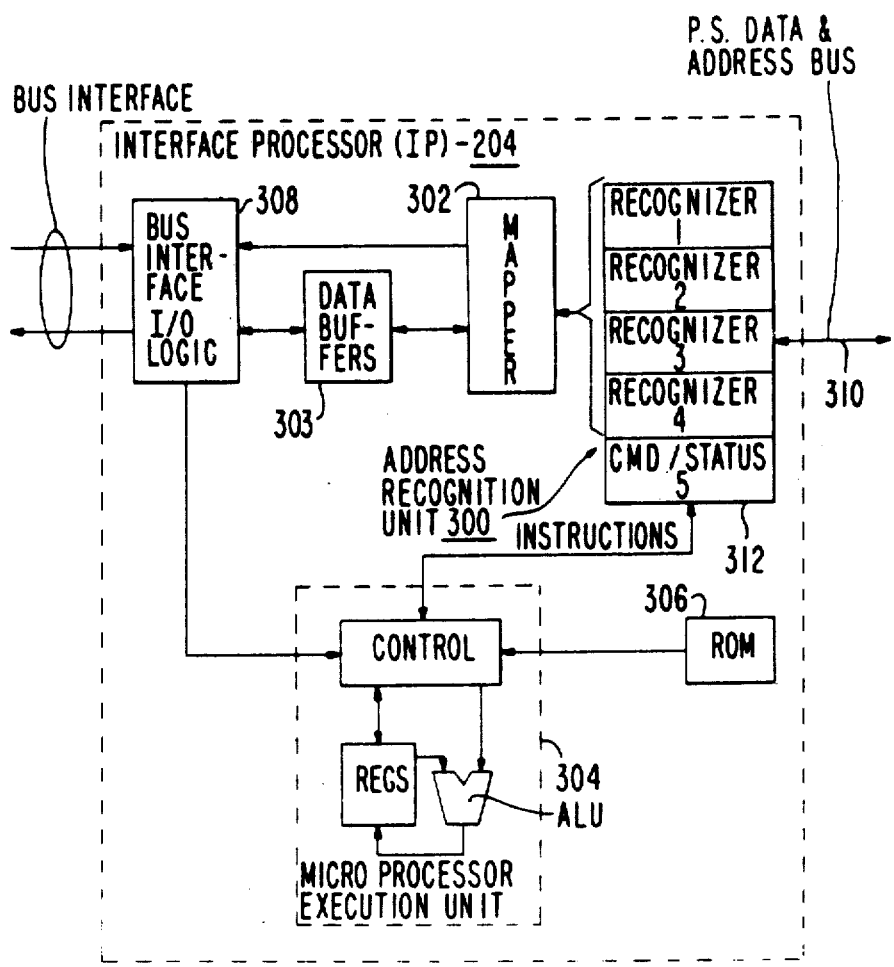
FIG. 1 is a functional block diagram illustrating the invention in relation to other components of a data processing system.

Referring now to FIG. 1, the following introductory description broadly describes the various elements of the system in which the invention is embodied and provides an introduction to some of the terminology used throughout the following specification. As set forth more fully in the above-identified U.S. Pat. No. 4,315,310 of John Bayliss, et al. for Input/Output Data Processing System, an interface processor provides two fundamental facilities, a mapping facility and a function-request facility. The address-mapping facility allows an attached processor to transfer data between two address spaces: a main-memory address space, referred to as the General Data Processor (GDP) address space, and a peripheral subsystem (PS) processor address space. A PS is the logical combination of an attached processor within a peripheral subsystem and an interface to an Interface Processor (IP) of the type in which the present invention is embodied. The IP enables an attached processor, such as an Intel 8085, 8086, 8088, etc., to interface with the data processing system and communicate with a GDP process or be controlled by that process.

An interface processor provides two fundamental facilities, aa address-mapping facility and a function-request facility. The address-mapping facility allows the attached processor to transfer data between two address spaces (the GDP address space and the I/O address space) by mapping a portion of the peripheral subsystem address space into a portion of the GDP address space. This mapping facility provides the peripheral subsystem with a "window" into the associated GDP subsystem. The IP accepts addresses from the attached processor within a certain subrange, or subranges, and translates them into references into one or more GDP data segments.

The function-request facility is provided to execute functions which enable the IP to bring an attached processor up to the architectural level of a General Data Processor. The function-request facility executes an extended instruction set which is available to software running on the attached processor to enable that software to perform certain functions which are available to other processors on the system.

The main elements of the apparatus are shown in FIG. 1: address recognition (300), address mapper (302), microprocessor execution unit (304), ROM (306), and bus interface I/O logic (308). These basic elements are described more fully in Section 9 of the general description of the above-identified Bayliss, et al. U.S. Pat. No. 4,315,310. Briefly, the IP can recognize five distinct address blocks in the peripheral subsystem address space. The address recognition unit (300) compares the memory address on the peripheral subsystem bus (310) for each read or write that occurs, with mask and start-address registers associated with each of its five address blocks. If an address falls within any of these blocks, a match is generated and appropriate addressing fields are passed on to the mapper (302). The recognizer can be set to function in one of two modes:

1. Random Mode: allows an external device to read or write single bytes or double bytes at random through the window.

2. Buffered Mode: Buffered mode can be used two ways:

2a. Pin-Hole Operation: allows an attached device to sequentially access the IP at one specific address for a predetermined number of accesses.

2b. Swept Operation: allows an attached device to access the IP with sequential addresses for a predetermined count.

The distinction between the above two types of operation, in buffered mode, is the mask register in the associative memory.

Recognizer 5 acts as a command/status register that occupies a portion of the peripheral subsystem address space.

The IP mapper (302) is similar to the reference generation unit in the GDP execution unit (see Section 10 of the above-identified Colley, et al. U.S. Pat. No. 4,325,120). Each recognizer has associated with it a register which points to the base of a GDP execution unit data segment. When a match is received from the recognizer, this base address is added to a displacement which the recognizer computes from either the peripheral subsystem bus address or the autoincrement counter.

The I/O logic (308) provides an interface to the GDP, which interface is more fully described in the above-identified Colley, et al. U.S. Pat. No. 4,325,120.

The ROM (306) holds the microcode necessary to execute the IP's limited set of GDP operators.

The microprocessor execution unit (304) executes a limited subset of the GDP instructions. The subset includes those necessary for the attached peripheral subsystem processor to be able to control buffers and execute its tasks. The attached processor makes requests by storing a copy of the desired instruction in the command register (312) on the IP. Completion of the instruction is signaled in the status register (312) and by an interrupt. A complete list and definition of the instructions is given in Section 7 of the above-identified Bayliss, et al. U.S, Pat. No. 4,315,310.

The sequential nature of both pin-hole and swept operations allows the IP to access memory in blocks of up to eight bytes. To benefit from this, the IP contains one data buffer (303) which is used for prefetching (on reads) and post writing (on writes). A buffer bypass is provided for operation in Mode 1.

DETAILED DESCRIPTION

Referring now to FIGS. 2a, 2b, and 2c, 16 AD lines (310) are provided and constitute a multiplexed address and data input/output bus connected to the peripheral subsystem ( S). When the SYNC line (311) is energized, the Ad lines become data input and output lines. Addresses are latched into the address latch (314) and output data are latched into the data latch (316). ,p The output of the address latch (314) is connected via the PS address bus (315) to an associative memory (300), which is comprised of five windows, 0–4. The address in the latch (314) is asynchronously checked to see if it falls within (matches) any one of the five window address ranges.

On the General Data Processor (GDP) side, an interface (308) is provided. Information on the address/control/data (ACD) input (309) is latched into the ACD latch (320). The PRQ line (322) and the ICS line (323) are connected to access sequencer logic (324). This logic controls the transfer of data to and from the GDP as more fully described in the above-identified Cooley, et al U.S. Pat. No. 4,325,120. The internal ACD (IACD) bus (307) is connected to the ACD latch and receives information from the microexecution unit control-word register (330), the 24-bit address adder (332), the interface register (334) which transfers information to and from the A bus, the MUX (336), and the data acquisition unit control-word register (338). The IACD bus provides for the transfor of information to the interface register (334) and the DAU control-word register (338).

Figure 2A:
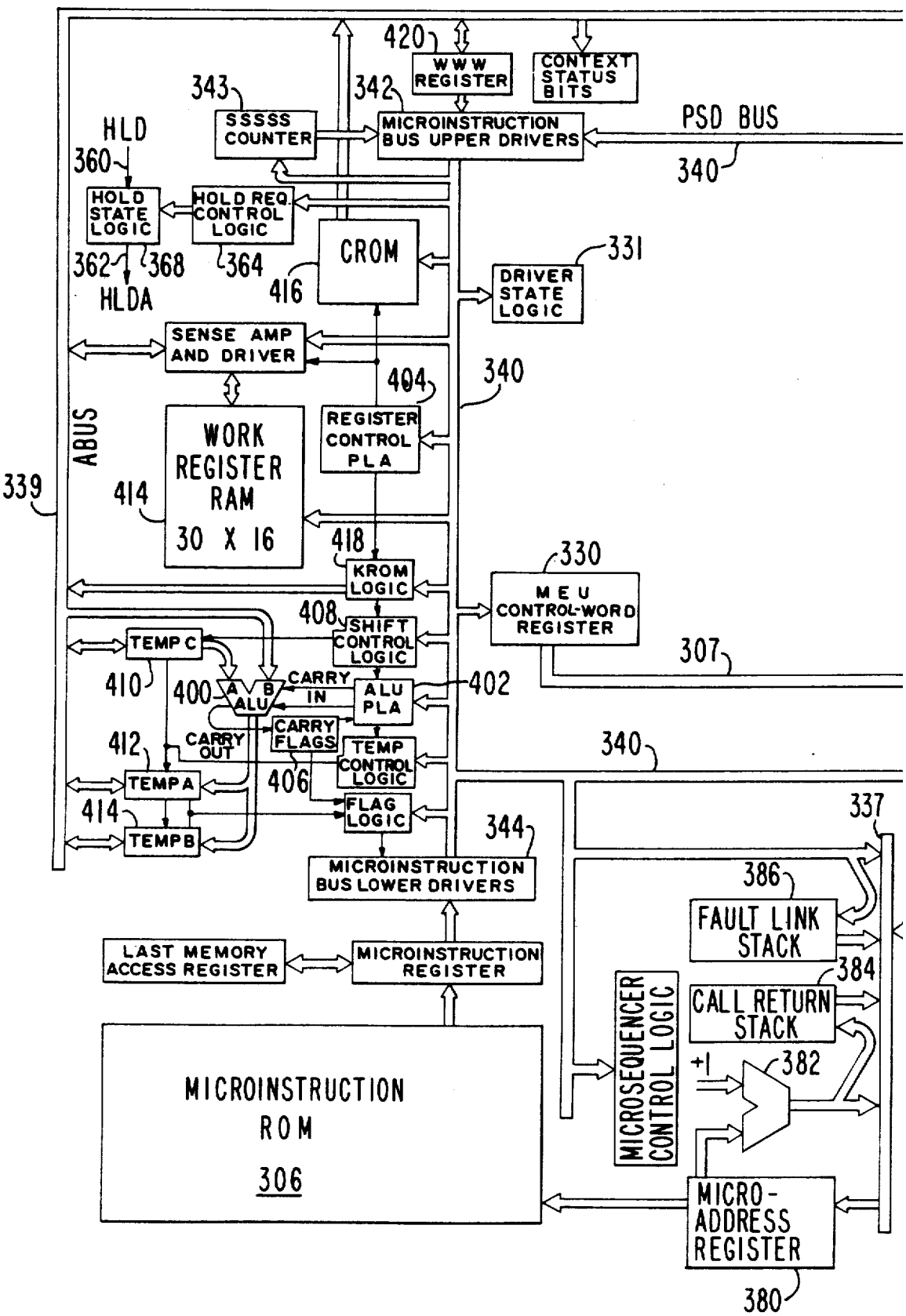

The microprocessor can be divided logically into two logical units, the microexecution unit (MEU) shown in FIG. 2a and the data acquisition unit (DAU) shown in FIG. 2c. These two units are connected together by means of the microinstruction bus (340). This bus is connected to the microinstruction bus upper driver (342) in the DAU and the microinstruction bus lower driver (344) in the MEU.

Microprocessor Initialization

When the INIT# pin is asserted, the following actions are forced:

1. The microaddress bus is zeroed.
2. The upper microinstruction drivers (342) are disabled and the lower drivers (344) are enabled. The driver state (DS) is reset to 00.
3. The lower drivers drive the output of the microinstruction ROM (306) onto the microinstruction bus (340).
4. All interrupt pendings and all interrupt actives are reset. INIT# active is set.
5. Slave/Master status is requalified according to the state of the HERR/MASTER# pin.

The contents of location 0 of the microinstruction ROM is therefore forced onto the microinstruction bus to be decoded and executed. By preagreement, location 0 is defined to always contain a Reset Processor microinstruction. INIT# therefore causes Reset Processor microinstructions to be executed. The Reset Processor microinstruction causes the following actions to occur.

1. All interrupt pendings and all interrupt actives are reset. INIT# active is set.
2. The FATAL# pin is reset to 1.
3. The DAU data buffer is reset.
4. The Access Sequencer (324) is reset.
5. The error state flag is set.
6. The shift count is reset to 0.
7. The chip deselect flag is reset.
8. The XACK# pin (313) is set to inactive.
9. The PS address latches (314) are opened.
10. The PS request logic is set.
11. The HOLD request and wait logic is reset.

Once the INIT# is released, the microprocessor executes the initialization flow microcode that begins at location 0 in the ROM. This microcode proceeds to initialize the DAU and the system objects. *Note*: Assertion of the CLR# pin causes execution of the RESET on ERROR microinstruction, bringing about a partial initialization. This microinstruction does everything listed above that the Reset Processor microinstruction does *except* for items 1 and 2.

| Microprocessor Pin Function Descriptions | |
|---|---|
| PIN NAME | I/O DESCRIPTIONS |
| ADxx | I/O  Address and Data (15-0) Three-State Asserted High, Partial FRC (once per read access) |
| | These pins constitute a multiplexed address and data input/output bus (AD bus 310). When the bus is idle, or during the first part of an access, these pins normally view the bus as an address. The address is asynchronously checked by non clocked logic to see if it falls within (matches) any one of the five window address ranges. The address is latched on the falling edge of ALE, thereby maintaining the state of a match or no match for the remainder of the access cycle. The addresses are then unlatched on the falling edge of OE. Once SYNC has pulsed high, the ADxx pins become data input and output pins. When WR# is high (read mode), data is now accessed in the microprocessor and the output buffers are enabled onto the ADxx pins if the OE is asserted. When WR# is low (write mode), data is sampled by the microprocessor one or two CLKAs after the rising edge of SYNC during the CLKA high time. The address is always a 16-bit unsigned number. Data may be either eight bits or sixteen bits, as defined by BHEN# and AD0. Eight-bit data may be transferred on either the high (AD15-AD8) or the low (AD7-AD0) byte. When eight-bit data is transferred on the high or low byte during read mode, the opposite byte is held in three-state. Twenty-bit addresses or more are accommodated by the external decoding of the upper four bits and incorporation in the external CS# logic. During the clock that write data is sampled, data must be setup to the rising edge of CLKA and must have hold time to the falling edge of that CLKA. Read data is driven out from a CLKA high and should be sampled on the next rising edge of CLKA. FRC sampling is not done synchronously to CLKA. It is sampled by the falling edge of the OE pin. |
| BHEN# | I    Byte High Enable, Asserted Low |
| | This pin, together with AD0, determines whether eight or sixteen bits of data are to be accessed, and if it is eight bits, whether it is to be accessed on the upper or lower byte position. This pin is latched by the falling edge of ALE. BHEN# and AD0 decode as follows: |
| | BHEN#    AD0  DESCRIPTION |
| | 0               0    16-bit access |
| | 0               1    next 8 bits on upper byte, lower byte tristate |
| | 1               0    next 8 bits on lower byte, upper byte tristate |
| | 1               1    next 8 bits on lower byte, upper byte tristate. |
| ALE | I    Address Latch Enable |
| | The rising edge of ALE sets a flip-flop which enables XACK# to become active. The falling edge of ALE latches the address on the ADxx pins and latches WR#, BHEN#, and CS#. If one uses a low pulse for ALE, one delays XACK# becoming active by delaying the rising edge of ALE further into the access cycle. |
| WR# | I    Write, Asserted Low |
| | This pin specifies whether the access is to be a read or write. It is asserted high for a read and asserted low for a write. This pin is latched by the falling edge of ALE. |
| OE | I    Data Output Enable, Asserted High |
| | During a read cycle, this pin enables read data onto the ADxx pins when it is asserted. During a read or a write cycle, the falling edge of OE signifies the end of the access cycle. |

-continued

| Microprocessor Pin Function Descriptions | |
|---|---|
| PIN NAME | I/O DESCRIPTIONS |
| | Specifically, the falling edge of the OE does three things: it resets the XACK# enable flip-flop, thereby terminating XACK#; it terminates DEN# if the cycle was a read; and it opens the address, BHEN#, WR#, and CS# latches. |
| CS# | I   Chip Select, Asserted Low<br>Specifies that the microprocessor is chip-selected and that a read or write cycle is requested. This pin is latched by ALE. |
| SYNC | I   Synchronized Qualifier Signal, Asserted High<br>A rising edge on this signal must be synchronized to the microprocessor or preferrably CLKB rising edge. This signal qualifies the address, BHEN#, CS#, and WR#, indicating that they are valid. It also initiates any internal action on the microprocessor's part to process an access. It starts the request for data to the microprocessor in a read access. In a write access, one or two CLKAs after SYNC pulses high write data is expected and sampled during CLKA high time. At INIT# time the microcode sets the write data sample time to two CLKAs after the first clock period of SYNC. This, however, can be modified to one clock cycle by making a macro request to the function request facility to change the write sample delay. The write sample delay is set in the context control register on the microprocessor chip. When the hold/hold acknowledge mechanism of the microprocessor is used, once HDA has pulsed high, a SYNC pulse is required to qualify the hold acknowledge since the HDA pin can be asynchronous. |
| INH1 | O   Inhibit, Asserted High, Partial FRC<br>This pin is asynchronously asserted by nonclocked logic when a valid mappable address range is detected. It can be used to override other memories whose address space is overlapped by a window. After INIT#, the microcode sets the INH1 mode for each window by loading the window entry-state registers in the microprocessor for each window. Once the subsystem is allowed to make a macro request, it can selectively disable or enable the inhibit mode on each window. This pin is gated off by chip-select. The selection of the inhibit mode for window 0, when in buffered mode, causes a corresponding built-in XACK# delay which delays the acknowledge from going active until two clock periods after the rising edge of SYNC. This was done to facilitate most MULTIBUS systems that use INH1, which require that the acknowledge be delayed. When the advanced XACK# mode is programmed, the inhibit mode should not be used on window 0 when in buffered mode, since the acknowledge will not be effectively delayed. This pin is FRC'd during the first clock period of SYNC assertion. |
| XACK# | O   Transfer Acknowledge, Asserted Low, Partial FRC<br>XACK# is used to acknowledge that a data transfer has taken place. For random or interconnect accesses, XACK# indicates that the transfer has taken place and was successful to or from GDP memory, unless XACK# is preceded by a one-clock wide low pulse on NAK# (Negative Acknowledge).<br>If XACK# is preceded by a low pulse on NAK#, then XACK# signifies that the access encountered a fault. If the access was a random access, other than window four, the window would have been placed in the fault state by the microcode. This will then cause any further accesses to this window to be ignored by the microprocessor and to have a NAK#-XACK# combination returned immediately, signifying negative acknowledge. For buffered accesses when the XACK-Delay is not in the advanced mode, XACK# signifies that the transfer took place and that it was successful |

-continued

| Microprocessor Pin Function Descriptions | |
|---|---|
| PIN NAME | I/O DESCRIPTIONS |
| | from/to the prefetch/postwrite buffer in the microprocessor, unless NAK# pulsed low. Using the advanced mode of XACK-Delay with the buffered window allows an advanced XACK# signal to be returned to the subsystem AP. This allows the possibility of running without wait states on the peripheral subsystem side. The acknowledge will be advanced during a read/write access if there is already data in the buffer/space or more data to be written into the buffer. In addition, the access must be a valid access. There are five things which affect XACK# behavior:<br>1. XACK-Delay: User programmable through the context control. This parameter establishes the minimum operating XACK# delay with respect to the SYNC signal.<br>2. XACK-Enable-Flip-Flop: This flip-flop is set by the rising edge of the ALE signal and reset by the falling edge of the OE signal.<br>3. Entry-State Registers: These are used to do two things: determine validity of the subsystem access and establish access modes.<br>4. Type of Access Behavior: Whether the access is random, buffered, or interconnect.<br>5. Faults: Bus faults, nonexistent memory, etc.<br>This pin is FRC'd during the first clock of SYNC assertion. |
| DEN# | O   Data Enable, Asserted Low, Partial FRC<br>This pin enables external data buffers which would be used in systems where the address and data are not multiplexed, such as a MULTIBUS. DEN# assertion begins no sooner than the CLKA high time of the first clock of SYNC, and no sooner than when OE goes high if a valid mappable address range is detected. It is disasserted with the falling edge of OE. In a write access it is also disasserted during the CLKA high time two CLKAs after SYNC assertion. This pin is FRC'd during the first clock of SYNC assertion. |
| INT | O   Interrupt, Asserted High, FRC<br>This output is a pulse two CLKAs wide and is asserted by the microprocessor interrupt microinstruction.<br>This pin is synchronously driven from the rising edge of CLKA. FRC sampling takes place during CLKA low time. |
| PSR | O   Peripheral Subsystem Reset, Asserted High, FRC<br>PSR is asserted by the microprocessor under microprogram control. When asserted, the peripheral subsystem should be reset. In a debug type of control it may be desirable to use this pin to set a status bit in an external register or possibly cause a special interrupt. This pin is normally asserted by the IP if the microcode determines that the subsystem is doing something wrong and would not respond to other means of control. This signal is synchronously output off of the rising edge of CLKA. FRC sampling occurs during CLKA low time. |
| HLD | O   Hold Request, Asserted High, FRC<br>The hold/hold acknowledge mechanism is an interlocking mechanism between the peripheral subsystem and the microexecution unit inside the microprocessor. The first high pulse on HLD is used to request and grab hold of the subsystem bus, thereby guaranteeing that the subsystem will not make an access to the microprocessor while the microexecution unit performs some function requiring interlocking. At the same time, the microexecution unit is waiting for the DAU to complete the interlock. Generally, when the subsystem is not making an access on its bus, it will return a high pulse to the HDA pin. This tells the DAU that it has grabbed the |

-continued
Microprocessor Pin Function Descriptions

| PIN NAME | I/O DESCRIPTIONS |
|---|---|
| | subsystem bus. The DAU then lets the microexecution unit proceed with its operation. When the microexecution unit no longer needs the interlock, it executes a reset-hold microinstruction which causes a second high pulse on HLD, thereby releasing the subsystem hold and terminating the interlock. This signal is synchronously output off the rising edge of CLKA. FRC sampling occurs during CLKA low time. In special cases it may not be necessary to use the HLD function interlocking. In this case HDA can be tied high and no SYNC pulse will be required for HDA qualification. The hardware detects this condition by noting that the HDA pin was high a half-clock before HLD requested a hold. In this mode the HLD output still functions and can be monitored if desired. |
| HDA | I  Hold Acknowledge, Asserted High HDA is asserted by the peripheral subsystem when the microprocessor's request for a hold has been granted. HDA need only be a high pulse and can be asynchronous to CLKA. HDA must be followed by a SYNC pulse in order to synchronously qualify it. |
| NAK# | O  Negative Acknowledge, Asserted Low, FRC This signal precedes XACK# in order to qualify it as a negative acknowledge. This pin is pulsed low for one clock period. When the microprocessor is in physical mode and making an interconnect access, negative acknowledge may be used to indicate that the access was made to nonexistent interconnect address space. This will allow determination of the system configuration by a subsystem processor at system initialization time. This pin could be used to set a status bit or cause a special interrupt or any number of other ways to transmit the information back to the subsystem. This signal is synchronously driven off of CLKA falling edge. FRC sampling occurs during CLKA high time. |

GDP System Side Pins

| | |
|---|---|
| INIT# | I  Initialize, Asserted Low Assertion of INIT# causes the internal state of the microprocessor to be reset and starts execution of the initialization microcode. INIT# must be asserted for a minimum of ten clock cycles. Some time after the INIT# pin is returned to its nonasserted state, microcode will have initialized all of the internal registers and windows and will be waiting for an IPC. Two clock periods after the INIT# pin is asserted, the HERR/MASTER# pin will be sampled to determine whether the microprocessor is to be a master or a slave processor for FRC purposes. HERR/MASTER# will continue to be sampled until two clock periods before INIT# is deasserted. At this time the state of the master/checker will be latched. |
| ALARM# | I  Alarm, Asserted Low The ALARM# input signals the occurrence of an unusual system-wide condition. An example is power failure. The microprocessor responds to ALARM# by starting a microsubroutine written to handle that situation. ALARM# is sampled on the rising edge of CLKA. |
| CLR# | I  Clear, Asserted Low CLR# is the highest priority interrupt of the IP. It is designed to immediately stop and synchronize all IPs receiving the CLR# signal. Assertion of CLR# results in a microprogram trap which causes the microprocessor to immediately terminate any bus transactions or internal operations which may be in progress at the time, disable the chip select, and set the error state. Once a CLR# service routine has started it cannot be interrupted. Response to CLR# can only be reenabled by the execution of a RESET PROCESSOR microinstruction or assertion of the INIT# pin. The CLR# microsubroutine will execute the RESET ON ERROR microinstruction and then wait for IPC. Executing RESET ON ERROR causes a partial reset of the IP, thus putting the device in a known state. After executing RESET ON ERROR, several NOOP microinstructions are executed to allow for clearing and propagation of the reset. The earliest time that the components can be assumed to be resynchronized again is at the beginning of the fourth cycle after CLR# is asserted. CLR# is sampled by the microprocessor on the rising edge of CLKA. |
| HERR/ MASTER# | O/I  Hardware Error, Open Drain Output, Asserted Low, No FRC. Master Input, Asserted Low. HERR is used to signal a discrepancy between a master and itself (i.e., preoutput buffer vs output pad) or between a master and a checker. The sampling of errors will occur at the time most appropriate for the particular output being checked. The AD output will be checked on the falling edge of OE; INH1, XACK#, and DEN# will be checked during the first clock period after SYNC assertion; and INT, PSR, HLD, and NAK# will be checked during CLKA high time. No other outputs will be checked. The HERR pin is also used to specify master/checker mode at initialization time. Two clock periods after the INIT# pin is asserted the HERR/MASTER# pin will be sampled to determine whether that microprocessor is to be a master or a slave processor for FRC purposes. HERR/MASTER# will continue to be sampled until two clock periods before INIT# is deasserted, at which time the state of the master/checker will be latched. HERR is able to sink 8mA (IOL) at 0.4 volts. |
| FATAL# | 0  Processor Fatal, Asserted Low, No FRC FATAL# is asserted by the processor under microcode control when the processor is unable to continue due to various error fault conditions. Once FATAL# is asserted, it can only be reset by assertion of the INIT# pin. |
| PCLK# | I  Processor Clock, Asserted Low Assertion of PCLK# for one cycle causes the system timer in the microprocessor to decrement. Assertion of PCLK# for two or more cycles causes the system timer to be reset. PCLK must be unasserted for at least 10 clock cycles before being asserted again. |
| PRQ | 0  Processor Packet Bus Request, Asserted High, FRC PRQ is similar in function to ALE (on the PS side) in that it signals the start of a transaction and defines when the address is valid. PRQ is high during the first cycle of a bus transaction, when the upper eight bits of the ACD bus carry control word information and the lower eight bits carry the lowest eight bits of the address. PRQ is also high during the second cycle of a transaction that is to be canceled. During this cancellation cycle the ACD bus does not carry any valid information. All other times PRQ is low. |
| ICS | I  Interconnect Status ICS has four interpretations or significances, depending on when it occurs in a transaction. ISC has either: 1. IPC (Interprocessor Communication) significance (high: no IPC waiting; low: IPC waiting) during the time when there are |

| GDP System Side Pins | | |
|---|---|---|
| | | no transactions in progress, during the first two cycles of every transaction, and following the error significance cycle of each transaction. There is always at least one IPC significance cycle between any two transactions. The microprocessor recognizes a single assertion of ICS during IPC significance as signalling that an IPC is waiting, although ICS may be asserted for longer. ICS must be unasserted for at least one cycle between any two IPC requests occurring during any one IPC significance period. |
| | 2. | STRETCH significance (high; do not stretch; low: stretch) beginning with the third cycle of each transaction and lasting until all data transfers have been completed. ICS during STRETCH significance is similar in function to the READY pin on most microprocessors. For writes, nonassertion of STRETCH acknowledges the receiving of the data being driven out on the ACD pins. For reads, nonassertion of STRETCH informs the microprocessor that valid data will be driven into the microprocessor on the following rising edge of CLKA. |
| | 3. | BUS ERROR significance (high: error; low: no error) for one cycle immediately following the last data transfer acknowledged by not stretching. |
| | 4. | NO significance while CLR# is active, or during the cycle after a cancellation cycle. |
| BOUT | 0 | Enable Buffers For Output, Asserted High, No FRC BOUT may be used to control external ACD bus buffers. When BOUT is high, it enables external buffers to drive information outward from the processor. When BOUT is low, it enables external buffers to drive information inward towards the processor. BOUT changes following the rising edge of CLKA. |
| ACDxx | | I/O Address, Control, and Data Bus, FRC The ACD pins normally reside in a high impedance state when there is no transaction taking place or in response to INTl#. They are placed in output mode during the first two cycles of all transactions, during which time address and control information are driven out. They are also in output mode during subsequent cycles of a write transaction until all of the data has been transferred. For a read transaction, the ACD pins return to high impedance state input mode immediately after the address information has been transferred out. |
| CLKA, CLKB | I | Clock A, Clock B CLKA provides the basic timing reference for the microprocessor. CLKB follows CLKA by one-quarter cycle and is used to assist internal timings. |

GENERAL MICROPROCESSOR OPERATION

As explained previously, the microprocessor can be thought of as two separate pieces, the Data Acquisition Unit (DAU), shown in FIG. 2c, and the Microexecution Unit (MEU), shown in FIG. 2a. The DAU connects externally to the peripheral subsystem and to the GDP system. The MEU connects externally only to the GDP system. The DAU provides only an access path to the GDP system memory for the peripheral subsystem. The MEU executes operators requested by the peripheral subsystem and in addition responds to messages from the GDP system (i.e., IPC, ALARM, etc.). Communication between the peripheral subsystem and the MEU, such as making an operator request to the MEU, takes place in a memory segment in the GDP system memory called the context data segment. Operators that can be executed by the MEU include modification of the access path through the DAU. It is noteworthy here that the peripheral susbsystem can in no direct way read any of the registers inside the microprocessor, but may only examine an image of them in the context data segment.

Communication between the Peripheral Subsystem and MEU (Example)

A typical scenario for this example might be as follows. the subsystem writes through the DAU into the context data segment requesting the MEU to execute a macro operator. The request is made by several accesses to the context data segment whereby the operands and the opcode of the request are specified. The displacement locations in the context data segment where the operands and opcode are written are predefined. The operands are written first and the opcode is written last. An access to the opcode displacement in the context data segment is hardware-recognized by logic inside the DAU and this causes an interrupt to the MEU.

At this point the MEU branches to a service routine, reads the opcode and operands out of the context data segment, and goes about servicing the request. At the completion to handling the request the MEU posts status in the context data segment and asserts the interrupt pin to the peripheral subsystem. At this time the peripheral subsystem can make further read accesses to the context data segment to determine the outcome of the request.

Context Data Segment

The context data segment is composed of six sections are shown below:

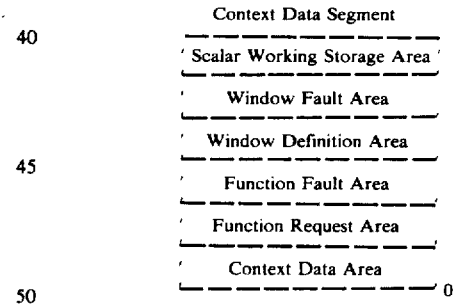

Further description of the context data segment can be found in Section 4.5.1.2 of the above referenced Cooley et al U.S. Pat. No. 4,325,120.

Window Concept

The DAU can recognize up to five nonoverlapping address ranges in the peripheral subsystem address space. These address ranges define segments in the subsystem address space where the subsystem can access through the DAU to the GDP system memory. These address ranges are sometimes called windows since they allow the peripheral subsystem to peer through the DAU into GDP system memory-segments. These windows are initialized by the MEU and can be modified, turned off, turned on, or moved in the subsystem address space by macro requests made by the peripheral subsystem through the DAU function request facility.

Each window can be 0 to "2 to the N" bytes in size, where 0 is less than N and N is less than 16. Each window can start on any "2 to the N" byte boundary. The windows must not overlap and the sum of their total sizes cannot exceed 65K bytes. A chip select pin is also provided so that the microprocessor can exist in a larger peripheral subsystem address space.

Each window has its own address-mapping functin whereby the peripheral subsystem address is mapped into a physicalsystem address. This is done by taking the displacement into the peripheral subsystem window and adding it to a base address of the associated segment in the GDP system. This produces the GDP systen physical address.

Some of the windows can be set up to have special behavior. Window 0 can be set-up to operate with a prefetch/postwrite buffer which allows high-speed block transfers. Window 1 can be set-up to allow accesses to the system interconnect-address space. Window 4 is always dedicated as the context data window. In Window 4 the sixteenth byte location is the hardware-recognized displacement that causes an interrupt to the MEU signifying that the peripheral subsystem requested the MEU to execute a macroinstruction.

The behavior of Windows 1 through 4 is determined by three registers internal to the microprocessor. These are the entry-state (351, FIG. 2b), base-address, and the mask registers (372, FIG. 2b). The entry-state register determines the mode in which the particular window will operate (see the subsequent heading "Entrystate"). In addition, some of the bits are status bits which also determine how a window will behave.

The base register specifies the address of the window base in the peripheral subsystem address space. The mask register specifies the length of the window in the peripheral subsystem address space. The base and the mask are both sixteen bits wide. The upper bits of the peripheral subsystem address are compared to the base register to determine a window match where the mask is set to 1s. The rest of the peripheral subsystem address is used as the displacement into the segment in random and inerconnect type accesses. (See the subsequent heading "Map Random/Interconnect Access Operation".)

Window 0 behavior is determined by the same registers as above; however, in addition Window 0 behavior is also affected by three other registers when used in the buffered mode. These are write-count (358), read-count (359), and the block-count (343) registers. The write-count register is used as the displacement in the buffered mode. The read count is used only by microcode in fault handling. The block count is used in determining completion of block transfer and in handling block transfer end conditions. (see the subsequent heading "Map Buffered Access Operation".)

When interfacing the microprocessor to the peripheral subsystem, there are three basic input pins that require most of the considerations for interface timing. These are ALE (address latch enable-319), OE (Output Enable-313), and SYNC (311). XACK# (311) is the primary output pin which plays an important role in the interface timing. (See the previous heading "Pin Function Descriptions").

Figure 5:
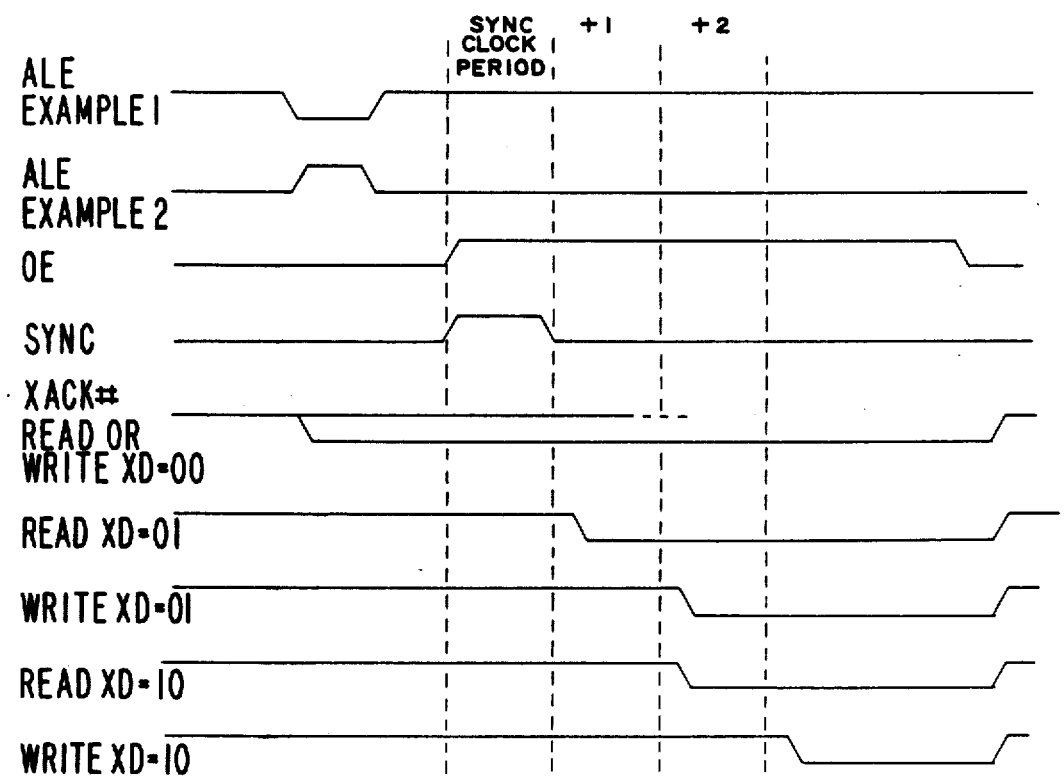
FIG. 5 is a timing diagram showing the relationship between the ALE, OE, SYNC and XACK lines.

The basic format of these signals is shown in FIG. 5. In following sections, two examples are shown of how this format inerfaces to some common buses.

The difference between Case 1 and Case 2 of ALE makes no difference to the DAU. However, there is a difference to the peripheral subsystem. Case 1 will possibly have a later acknowledge, since the acknowledge is enabled by a Xack-Enable flip-flop which is set by the rising edge of ALE. (See ALE Pin Function Description). By using Case 1, the acknowledge could be purposely delayed, by delaying the rising edge of ALE further into the access cycle if it is so desired to meet some special aknowledge timing.

OE is used in both read and write access cycles. It will only enable the AD output buffers (316) in a read access. The falling edge of OE is used to signal that the access is done and to set-up for the next access. The specific actions that the falling edge causes are to open the address latches to look for a new address match and to reset the Xack-Enable flip-flop. (See Subsystem Interface Functions.)

Context Status

The Context Status can be used to optimize the interface timing. (See Context-Status Register in Subsystem Access Control). The Context-Status Register affects two different timing parameters. The first is the Write-Sample-Delay which affects how long after Sync the DAU will sample write data. FIG. 5 shows the two cases.

The second parameter that the Context Status Register sets is the minimum acknowledge time when used in the buffer mode. See FIG. 5.

Present Legal Combinations of Write-Sample-Delay (WSD) and Xack Delay (XD) are:

|  |  | X<br>D | W<br>S<br>D |  |
|---|---|---|---|---|
| (2, | 1, | 0) | | |
| 0 | 0 | 0 | - Case 1 |
| 0 | 0 | 1 | - Case 2 |
| 0 | 1 | 0 | - Case 3 |
| 1 | 0 | 1 | - Case 4 |

Subsystem Interface Functions

The DAU subsystem interface has four main interface functions dealing with accesses. These are Address Handling, Data Handling, Sync, and Acknowledgement. In addition there are some other impotant interface functions dealing with general control. Some of these are Interrupt, Interlocks, and Subsystem Reset.

Address. Address-handling begins at the pins. Here, internally to the DAU, the address gets latched near the beginning of an access by logic (314) that detects the falling edge of ALE (319). Until this time the address latches (314) are open, allowing the addresses to pass through the latches to the window recognition logic (300). The address must be latched to allow multiplexing of the data on the Subsystem Address/Data Bus (AD Bus-310). At the end of the access cycle, whether read or write, logic (316) that detects the falling edge of OE (Output Enable) opens the address latches again allowing the address to propagate into the chip and set-up for the next access cycle. INIT leaves the address latches in the open state.

The peripheral subsystem address path consists of non-clocked logic. This allows the address to propagate through the chip asynchronously. Once the address becomes stable a synchronous external signal SYNC (311) qualifies the address to any internal clocked logic that uses the address. Allowing the address to propagate through the chip asynchronously allows the high speed asynchronous window compare and return of an advance acknowledge, if used in the advance acknowledge mode, and the INHIBIT Signal. It also renders it unnecessary to make the peripheral susbystem address synchronous to the system clock.

With respect to address handling, the peripheral subsystem interface must ensure that an address is valid within the specified setup time before SYNC. This allows the propagation time through the chip.

Data Drivers and Latches. When writing through the DAU to system memory, data is sampled by the DAU during the entire CLKA high time and fed directly onto the precharge/discharge bus (AD Bus 310). Data is sampled only during one specific clock period during a write access cycle. It is important, therefore, to quarantee setup time of valid data to the rising edge of the CLKA and guarantee hold time to the falling edge of CLKA during that specific clock period that it is sampled. The sampling clock period is either one or two clocks after the leading edge of the SYNC pulse (311). This is determined by the value programed in the Write-Sample-Delay field in the Context Status Register. (See Section Context Status Register.) INIT# always sets up Write-Sample-Delay to two clocks after the leading edge of SYNC.

During the read access the read data is latched once in the DAU output data buffers (316) and remains there until the next access. The enabling of the output data buffers (316) to the drive the AD pins (310) is determined by several factors. These are the OE pin (313), the BHEN# Pin, the AD0 pins, the INIT# pin, the Master/Slave mode, and whether the WR# pin latch specifies a read or write cycle.

The output AD data buffers (316) will only be enabled if all conditions below are satisfied.

1. The access is a read. Defined by the WR# pin latch.
2. The OE pin is asserted high.
3. INIT# is disasserted high.
4. The microprocessor must not be in checker mode.

The role that BHEN# and AD0 play is to specify whether the access is a double-byte or single-byte access, and if it is a single-byte access, whether the data is requested on the upper byte or the lower byte. For a single-byte access, the opposite byte side of the AD bus will be tristated. This allows interfacing the microprocessor to a local bus of an 8-bit processor such as the Intel 8088. The decoding of BHEN# and AD0 follows.

| BHEN# | AD0 | DESCRIPTION |
|---|---|---|
| 0 | 0 | 16 bit access |
| 0 | 1 | next 8 bits on upper byte, lower byte tristated |
| 1 | 0 | next 8 bits on lower byte, upper byte tristated |
| 1 | 1 | next 8 bits on lower byte, upper byte tristated |

Although OE (313) does not have any output enable function during a write access it is required since the falling edge of OE signals the end of the access cycle, allows the address latches to be opened and disables the Xack flip-flop.

SYNC logic (317). The SYNC function informs the DAU that the peripheral subsystem has placed its access request on the peripheral subsystem interface side of the microprocessor and that it has stabilized. Therefore the synchronous logic in the DAU can use the external information without suffering from asynchronous input conditions. In addition, the SYNC function also provides the synchronous qualification of the hold acknowledge function (if used).

The SYNC function can be broken into three distinct parts. These are:

1. To specify that a peripheral subsystem access request has stabilized and to qualify an internal start signal which causes the DAU to begin processing a peripheral subsystem access request.
2. To provide a timing reference from which parameters such as Write-Sample-Delay and minimum Xack-Delay can be timed.
3. To synchronously qualify the detection of the asynchronous hold acknowledge pulse.

One special characteristic of the SYNC pin is that it is the only peripheral subsystem pin that needs to be synchronized to CLKB. The SYNC pulse is required to have a synchronous leading edge and can be of any width from a 50 ns pulse up to two clock periods wide.

Internal processing of an access does not necessarily begin immediately after a SYNC pulse, but may wait until internal DAU conditions catch up to allow the operation. Such is the case in the buffered window if the peripheral subsystem accesses the buffer faster than the DAU can get data from memory. This kind of condition may be the result from some type of system fault condition.

Xack# logic (319). Xack# is the mechanism by which the DAU releases the peripheral subsystem from waiting for the access to be performed. The term release is used because, under conditions such as a faulted access, the DAU may not have completed the access by transferring valid data. The Xack# mechanism serves the following five functions.

1. To acknowledge to the peripheral subsystem that valid data was successfully transferred to/from the peripheral subsystem from/to the system memory in a random access.
2. To acknowledge to the peripheral subsystem that valid data was successfully transferred to/from the peripheral subsystem from/to a system interconnect register in an interconnect access.
3. To acknowledge to the peripheral subsystem that valid data was transferred to/from the Prefetch/Post-write data buffer in the DAU in an access through Window 0 when in buffered mode.
4. To acknowledge to the peripheral subsystem that the access faulted and that valid data was not returned.
5. To return control to the peripheral subsystem when it accesses a faulted window. In this case the access was completely ignored by the microprocessor.

Random or interconnect access acknowledges usually occur greater than 12 clock periods after the SYNC pulse. The 12 clock periods are basically the microprocessor overhead, including ACD bus format, in receiving the peripheral subsystem request, making an access request to the system memory, receiving the reply, and transferring the data and/or acknowledgment back to the peripheral subsystem.

Buffered acknowledges can occur as fast as 100 ns after valid address in advanced acknowledge mode; if the microprocessor must access the system memory to put/remove data from the data buffer it may be as long as a random access. In general, the buffer will tend to be empty when in write mode and will tend to be full when in read mode. In this type of situation the timing of Xack# will tend to be minimal, dependent on the Xack- Delay set in the Context Status Register in the microprocessor (see Context Status Register section).

When an access faults, acknowledge is not returned automatically. The MEU is interrupted and branches to a fault-handling routine which will handle the fault appropriately and will post status in the Context Control segment in system memory. The MEU will then generally assert the peripheral subsystems interrupt line and set the window fault state in the faulted window's Entrystate-register (see Entrystate section). At this point, the hardware returns the acknowledge to the peripheral subsystem to allow it to process its interrupt. Along with the acknowledge and preceding it by a half-clock cycle, the NAK# pin is asserted for one clock period. This signifies that the access did not have valid data returned and that the acknowledge was purely releasing the peripheral subsystem.

Any further accesses to that window will be ignored by the microprocessor and will have Xack# returned, qualified by a NAK#. No further interrupts will be asserted for accesses to that window unless it was set-up again.

Subsystem Access Control. Subsystem access characteristics, other than mapping parameters, are controlled primarily by three types of registers. These are the Entrystate (315), Context Status, and Base-and-Length Registers (372).

Entrystate (351). Each window has its own Entrystate Register. The following shows the breakdown between the different windows and their functions.

| BIT | Window 0 Entrystate Register. DESCRIPTION |
|---|---|
| 0 | Window Valid |
| 1 | Access Mode (0 for Random, 1 for Buffered) |
| 3, 2 | Read & Write rights |
|  | 00 - No read or write rights-not used |
|  | 01 - Read only |
|  | 10 - Write only |
|  | 11 - Both read and write-illegal in buffered mode. |
| 5, 4 | Transfer State |
|  | 00 - Transfer in progress |
|  | 01 - Transfer terminated due to completed block transfer-not used in random mode |
|  | 10 - Transfer terminated by force-not used in random mode. |
|  | 11 - Fault State-transfer terminated due to a fault |
| 6 | INH1 function enable (peripheral subsystem memory overlay) |
| 7 | Undefined Spare Bit |
| 15:8 | Reserved (zero filled) |

Bit 0 is used to turn the window on and off by hardware. This bit turns the window off by gating off the match line (301) for that window at the CAM (300). Bit 1 specifies whether the window will operate in the random mode or the buffered mode. Bits 2 and 3 specify that the peripheral subsystem can read or write to the system memory. In the buffered mode Bit 2 determines the direction that the data buffer points, i.e. read direction, or write direction. When Window 0 is in the buffered mode, Bits 5 and 4 specify the state of the transfer. When a block transfer is completed, the State 01 in Bits 5 and 4, respectively, is set by hardware. The fault state may be set by microcode for either random or buffered mode. This state causes a pending peripheral subsystem access to be acknowledged, thereby releasing the peripheral subsystem after a faulted access. In addition, the acknowledge will be accompanied by a NAK#. Any further accesses to that window with the fault state set will be immediately acknowledged, NAK#'d, and ignored by the microprocessor. Bit 6 enables the INH1 function in the peripheral subsystem interface. This is commonly used in MULTIBUS applications and essentially informs the peripheral subsystem that a window has been addressed and that it could possibly overlap peripheral subsystem memory. The peripheral subsystem would then use the INH1 signal to gate off the peripheral subsystem memory. Enabling of this function will affect the interface timing of the XACK# signal when this window is in the buffered mode. It will disable the XACK# signal from being asserted any earlier than two clock periods after the assertion of SYNC.

| BIT | Window 1 Entrystate Register DESCRIPTION |
|---|---|
| 0 | Window Valid |
| 1 | Access Mode (0 for Random, 1 for Interconnect) |
| 2 | Read right |
| 3 | Write right |
| 5,4 | Transfer State |
|  | 00 - Default |
|  | 01 - Illegal |
|  | 10 - Illegal |
|  | 11 - Fault state |
| 6 | INH1 function enable (peripheral subsystem memory overlay) |
| 7 | Undefined Spare Bit |
| 15:8 | Reserved (hardware zero filled) |

Window 1 is basically the same as Windows 2 through 4, except that it has the additional mode of being able to make accesses to the interconnect register space of the system. The only difference to the DAU between making an interconnect access and a random access is that the spec control word (part of the ACD bus packet format) is slightly modified.

| BIT | Window 2 through 4 Entrystate Register DESCRIPTION |
|---|---|
| 0 | Window Valid |
| 1 | Hardware Zero Tied |
| 2 | Read right |
| 3 | Write right |
| 5,4 | Transfer State |
|  | 00 - Default |
|  | 01 - Illegal |
|  | 10 - Illegal |
|  | 11 - Fault state |
| 6 | INH1 function enable (peripheral subsystem memory overlay) |
| 7 | Undefined Spare Bit |
| 15:8 | Reserved (hardware zero filled) |

Context Status Register. The Context Status register is one of the registers in the general register file (414) in the MEU. A copy of the information in this register is contained in the context data segment for the IP in system memory. In addition the DAU makes a copy of the first three bits of this register whenever the MEU executes a move-working-register-to-register microinstruction where the destination is the Context-Status Register.

It is important, in order to keep the DAU's copy up to date, for the MEU to only put information into the Context Status Register with a move-working-register-to-register microinstruction.

The copy that the DAU makes of the first three bits of the Context Status Register has hardware significance. These three bits specify two peripheral subsystem interface timing parameters. The decoding is shown below.

| BIT | DESCRIPTION |
|---|---|
| 0 | Write Sample Delay |
| | 0 - Write data gets sampled the second clock period after SYNC assertion. |
| | 1 - Write data gets sampled the third clock period after SYNC assertion. |
| 2,1 | Xack# Delay |
| | 00 - Advanced Acknowledge Mode |
| | 01 - Acknowledge will occur no sooner than |
| |    1 clock after SYNC assertion - read access |
| |    2 clocks after SYNC assertion - write access |
| | 10 - Acknowledge will occur no sooner than |
| |    2 clocks after SYNC assertion - read access |
| |    3 clocks after SYNC assertion - write access |
| | 11 - Illegal |

Legal Combinations of Write-Sample-Delay(WSD) and Xack# Delay(XD) are:

| XD (3, 2, | WSD 1) | |
|---|---|---|
| 0 0 | 0 | - Case 1 |
| 0 0 | 1 | - Case 2 |
| 0 1 | 0 | - Case 3 |
| 1 0 | 1 | - Case 4 |

The XACK# DELAY affects only buffered accesses since random accesses require more than three clocks after SYNC to return XACK# anyway.

Window Base-and-Length Registers-(372). The Base-and-Length Registers, like the Window Entrystate Registers, have Read-and-Write Rights bits. The Rights bits for Window 4 are unusual in that they are tied-active ROM bits. Usually the Read-and-Write Rights on the Entrystate Registers and the Base-and-Length Registers agree.

The length in the Base-and-Length registers also plays a role in peripheral subsystem accesses. Segments in the GDP System can be of arbitrary length. Segments which are defined in the peripheral subsystem address space by a window can only be of modulo "2 to the n." If a window is to be mapped to a nonmodulo "2 to the n" size segment in the system memory, then the next larger size window must be used. The length of the Base-and-Length registers will then be used to ensure that the peripheral subsystem will not access outside the segment.

Subsystem Random/Interconnect Access Operation

Random and interconnect accesses made by the peripheral subsystem are identical to the microprocessor hardware, with the exception of outputting a slightly different specification word on the ACD bus during the access. Window 1 is specified for interconnect accesses in the Window Entrystate. Under normal operation Window 1 can only be set up to make interconnect accesses when in physical mode. (For more information on Physical Mode vs Logical Mode, see Section 2.0 of the above-identified Bayliss et al. patent.)

Random/Interconnect accesses basically hold the peripheral subsystem by not returning acknowledge until the data has been successfully accessed from/to system memory and data/reply has been returned to the peripheral subsystem bus. For this reason Random accesses consume a number of clock cycles of overhead. Generally microprocessor Random-Read overhead is about 12 clocks and Random-Write overhead ranges from 12 to 13 clocks depending on the value of the Write-Sample-Delay.

The sequence of events follows.

1. Upon seeing the SYNC pulse (and after Write-Sample-Delay in the case of a write access), a request is made for use of the internal access sequencer. One clock (not including Write-Sample-Delay).

2. Arbitrate for use of the access sequencer. One clock.

3. Access sequencer cycles to output request package on the ACD bus. Six clocks plus memory-access time.

4. Check for bus error. Two clocks.

5. Return data on Read-and-Return Acknowledge. One to two clocks.

Figure 6:
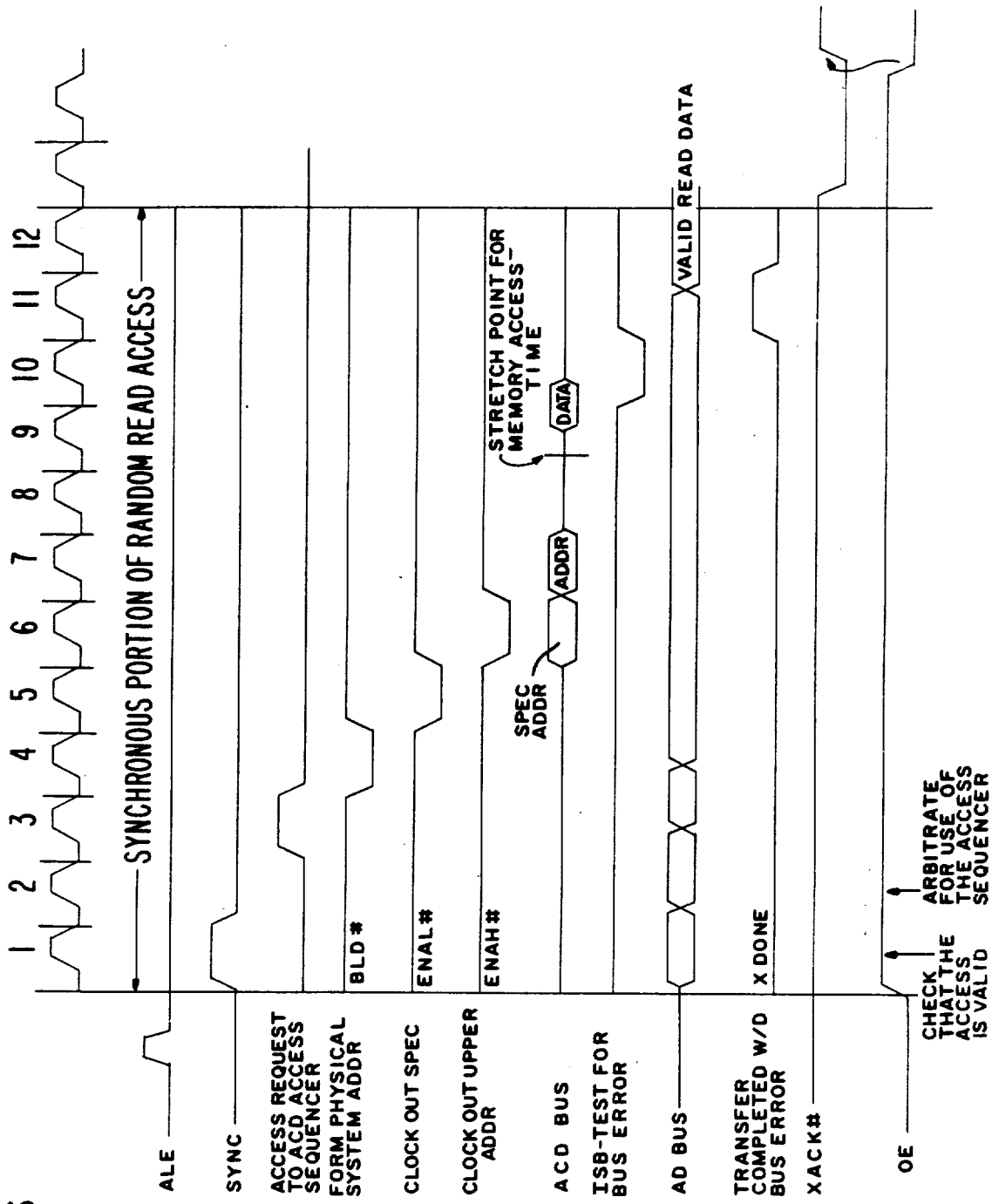
FIG. 6 is a timing diagram of random read access in the microprocessr in which the invention is embodied.
Figure 7:
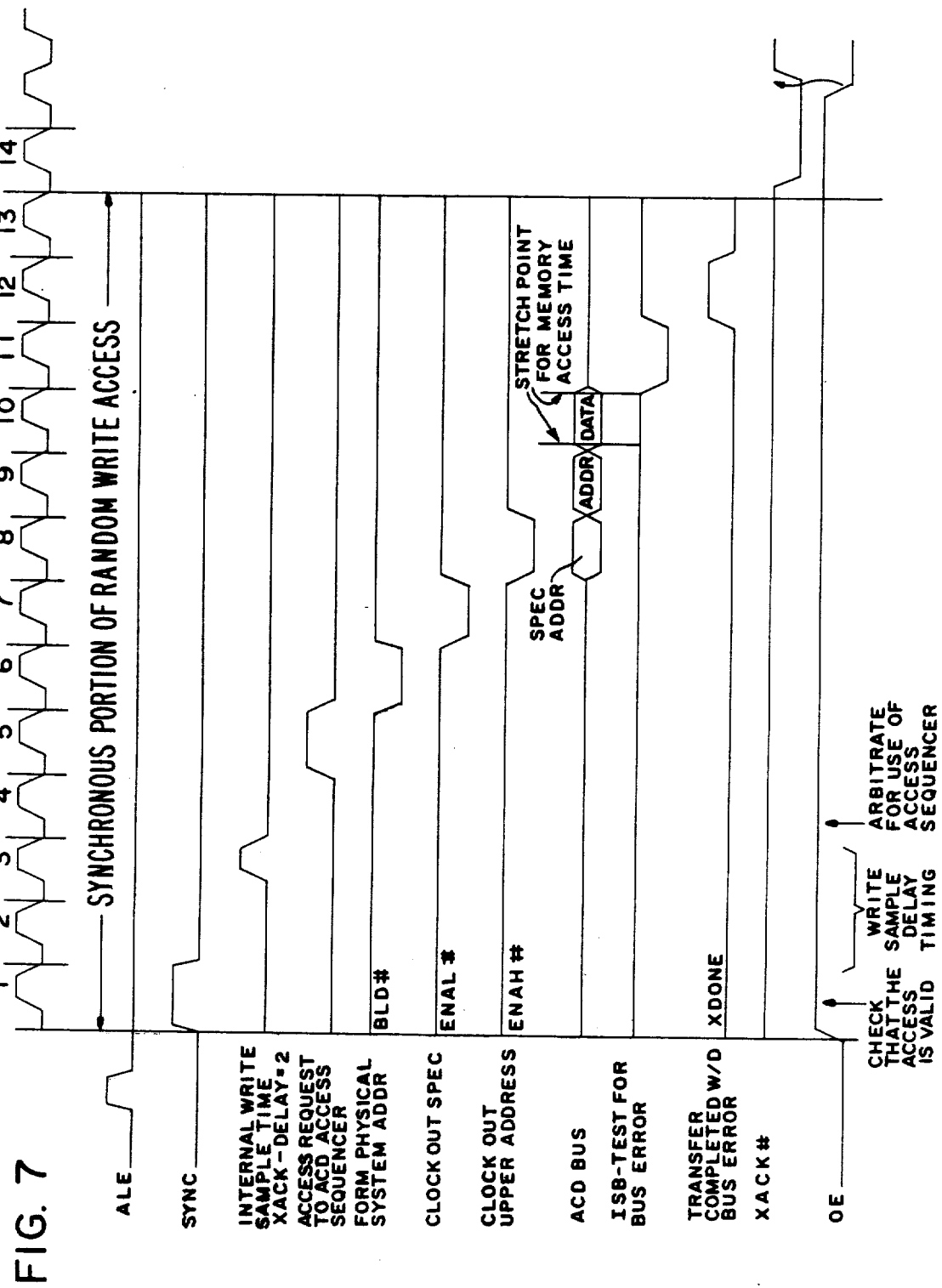
FIG. 7 is a timing diagram of random write access in the microprocessor in which the invention is embodied.

For specific timing for Read and Write, see FIG. 6 Microprocessor Random Read Access Timing Flow and FIG. 7 Microprocessor Random Write Access Timing Flow.

Subsystem Buffered Access Operation

Using Window 0 in the buffered mode provides high data transfer rates of up to approximately 6.6 megabytes per second (assuming 10 Mhz clock). This is useful for block transfers of files, etc. It probably is not useful for movement of very small files since for each block the window must be completely set-up. In order to determine if the buffered mode is beneficial, the difference between transfer time and setup time (time for execution of an alter-map request by the MEU) must be evaluated.

On buffered accesses the access data is buffered internally in buffer (350), FIG. 2c. This is where the buffered mode gets its speed. The peripheral subsystem only has to wait until the data is accessed from/to the data buffer internal to the microprocessor. This can be almost immediate, thereby allowing up to Waitstate Free Operation on processor local buses where advanced status is available.

In the buffer mode, data is transmitted on the ACD bus in the most efficient fashion (in large packets). The buffer status logic (352) determines the optimal time to send each packet. Packet sizes are always eight bytes except for end-block transfer conditions, when smaller size packets are needed to finish the block transfer. The maximum number of end-condition transfers needed could be up to two. For example, if there were seven bytes left to transfer, first six bytes and then one byte would be the final transfers.

When in Read mode, the buffer (350) prefetches two 8-byte packets from system memory as soon as the window is established. This provides ready data waiting for the peripheral subsystem to access. Whenever the buffer becomes more than half-empty, there is room for another transfer of eight bytes into the buffer. The status logic (352) then requests service from the access sequencer (324) and another eight-byte packet is transferred in.

When in the Write mode, the buffer waits until the buffer is half-full and then requests the access sequencer to make an eight-byte transfer out to memory.

Figure 2B:
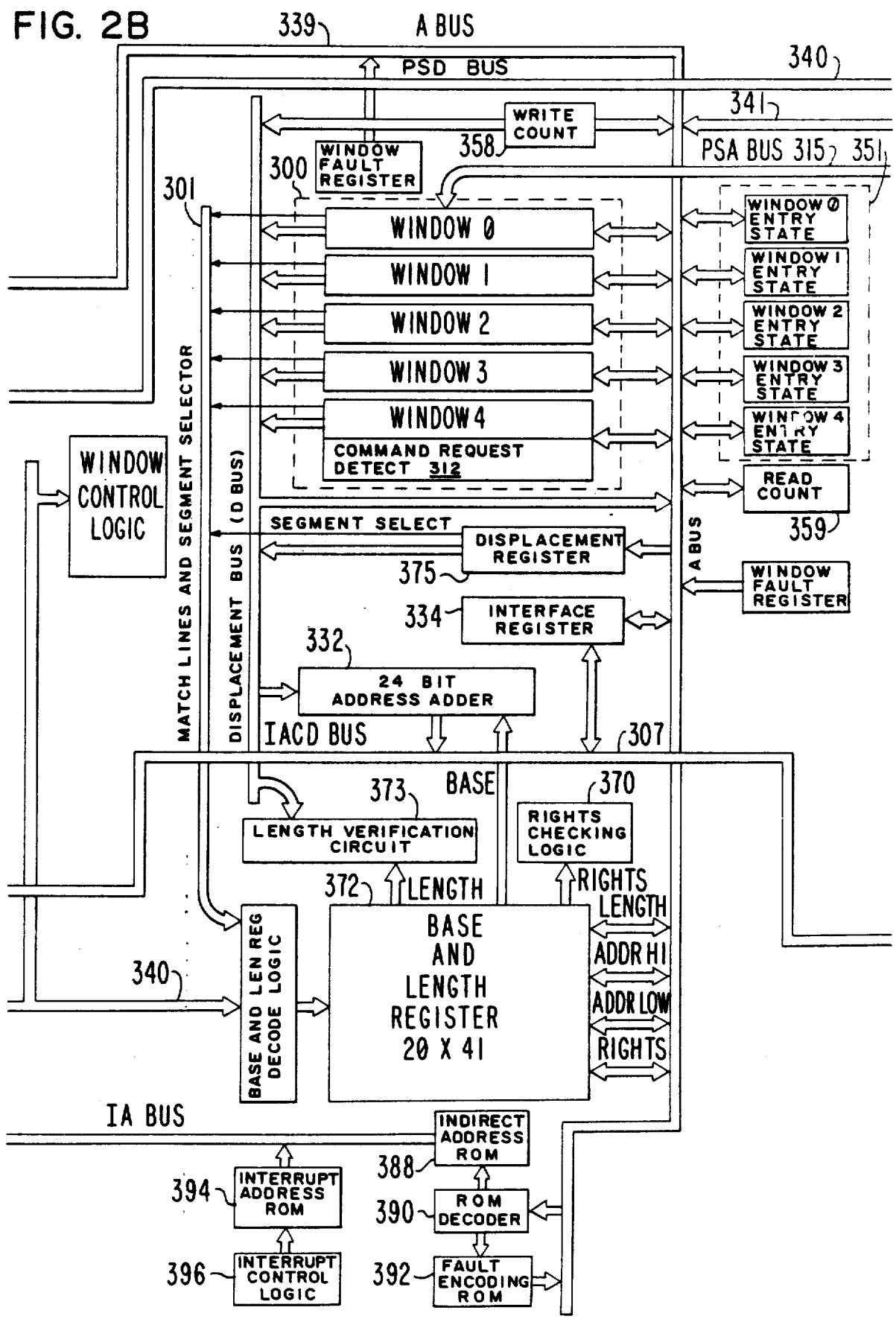

The Block-Count Register (343) of FIG. 2b is used to determine whether and when End-Conditional accesses are required. The block count is decremented whenever a byte or double byte is transferred into the buffer (350), whether in the Read mode or in the Write mode. This register is a count of the number of bytes to be transferred into the buffers. Because of this operation it decrements by 1 or 2, depending on whether a single or double byte is written into the buffer.

During Random accesses, the displacement in the system segment is the same as the displacement in the peripheral subsystem window. During Buffered accesses, the displacement is maintained by an internal register known as the Write-Count Register (358). In Buffered mode, it does not matter what the displacement is in the peripheral subsystem window. The only purpose of the peripheral subsystem address is to match a window, since the displacement in the system segment is controlled by the Write-Count Register.

The Write-Count Register increments each time the buffer transfers a packet of data in or out of the system memory. The write count is incremented by the number of transferred bytes. Therefore, it increments by 1, 2, 4, 6, or 8.

If a fault occurs with a buffered access, when in Buffered Write mode, the Write count and the block count are used to determine the number of bytes already successfully transferred to/from system memory.

If a fault occurs with a buffered access, when in Buffered Read mode, the Read count and the block count are used to determine how many successful transfers have occurred. The Read-Count Register increments by 1 or 2 bytes each time a byte or double byte is transferred in or out of the peripheral subsystem buffered window.

The buffer is a byte-packing data buffer. For more information on how the buffer works, see Data Path Details under the Data Acquisition heading.

Map Interlocks and Operation

Since the peripheral subsystem is usually asynchronous to the microprocessor, and since the time when most peripheral subsystems sample their Acknowledge is different from the time that they sample data on reads, it is important that DAU registers which affect the Acknowledge not be changed by the MEU when the peripheral subsystem is making an access. This creates the need for an interlock mechanism between the peripheral subsystem and the MEU. This interlocking mechanism is performed by the DAU. Interlocking is also required between the MEU and the System Side Access Sequencer when transferring data, either buffered or random, from the peripheral subsystem to the system memory.

The specific interlock function is communicated through the HLD (hold) pin (360) and the HDA (hold acknowledge) pin (362) to the peripheral subsystem. A first high pulse on HLD is used to request and grab hold of the peripheral subsystem bus, thereby guaranteeing that the peripheral subsystem will not make an access to the microprocessor while the MEU performs some function requiring interlocking. At the same time, the MEU is waiting for the DAU to complete the interlock. Generally, when the peripheral subsystem is not making an access on its bus, it will return a high pulse to the HDA pin. This tells the DAU that it has grabbed the peripheral subsystem bus. The DAU then lets the MEU proceed with its operation. When the MEU no longer needs the interlock, it executes a reset hold microinstruction which causes a second high pulse on HLD, thereby releasing the peripheral subsystem hold and terminating the interlock.

First Level Interlocks. The particular functions which the MEU might perform that need interlocking are listed below.

1. Write into a mapper register, which could be a Cam Window Base Register, Cam Window Mask Register, Window Entrystate Register, Read Count Register, Block Count Register, or Write Count Register.
2. Move Working Register into the Context Status Register.
3. Reset the buffered window Data Buffer.
4. Reset Hold. Release of second level interlock (to be discussed further below).

The following explains why each of these needs to be interlocked.

Write into Mapper Register. Each of the following directly affects the Acknowledge back to the peripheral subsystem: the Cam Base Register, Cam Mask Register, Window Entrystate Register and Block Count Register. The acknowledge could be indeterminate if the peripheral subsystem were writing through a window while the characteristics of the window changed (by one of these registers being changed).

For example, suppose that the peripheral subsystem is making an access through Window 2 and the MEU changes the Cam Base Register moving the window. There is the possibility that the peripheral subsystem already got its Acknowledge, signifying that the access was successful, but had not yet sampled its data. In this case, a NAK# would not have occurred to inform the peripheral subsystem that the data was bad when it was sampled.

Without an interlock, the Block Count, Read Count, and Write Count registers might be reset by the MEU during an access by the peripheral subsystem or the internal access sequencer. In this case the MEU could not rely on those registers remaining at what was written into them.

Move Working Register to Context Status Register. In this case, the bottom three bits of the Context-Status Register control the peripheral subsystem interface timing. The interface timing parameters must not be changed in the middle of an access.

Reset the Buffered Window Data Buffer. This is interlocked for the same reason as the Block Count and the Write Count registers.

Reset Hold. Reset Hold interlocking is required under a special situation. This occurs because of the way a peripheral subsystem usually responds to interlocking (see second level interlocking).

Second Level Interlocks. Since the peripheral subsystem will only acknowledge a HLD when it is not in the middle of an access, special conditions can arise in which the peripheral subsystem is stuck in the middle of an access (such as a faulted access) and the MEU needs to interlock the peripheral subsystem. In this case the peripheral subsystem could not respond to the interlock and this would result in a deadlock condition. Correction of these kinds of situations is handled by Second Level Interlocks.

In these deadlock conditions, the DAU hardware detects the condition and then disables the peripheral subsystem XACK#, thus ensuring that the subsystem will remain in a locked condition. The DAU then returns control to the MEU and allows it to proceed. The MEU can now complete its present routine and then proceed to its fault routine (in which it will probably set the fault state on that window) to handle the fault situation that leads to the peripheral subsystem locking up.

Once it has handled the fault, such that when the peripheral subsystem is let go it will continue normally, the MEU executes a Reset-MAP-Error-State microinstruction. This reenables the Acknowledge pin and allows the peripheral subsystem to proceed.

At this point, the MEU will execute a Reset Hold to release the hold request made earlier. If, however, for the above reasons, the peripheral subsystem has not yet responded with HDA, the MEU will be held by the first-level interlock for return of HDA. The interlock will release the peripheral subsystem with a second pulse on the HDA pin, thereby terminating the interlock.

THE DATA ACQUISITION UNIT

Data Path Details

The data path is composed of the Subsystem Interface, Buffer-Bypass Register (355), Data Prefetch/Postwrite Buffer and the ACD Bus Interface (308). For description of the peripheral subsystem interface, see Subsystems Interface functions. For description of the Buffer-Bypass Register and the Data buffer, see the sections below. For description of the ACD Bus Interface, see the heading: The Internal ACD (IACD) bus.

Buffer-Bypass Register

The Buffer-Bypass Register (355) is 16 bits wide and is the transfer storage point between the GDP interface logic and the peripheral subsystem logic. A Random-Access request is made by the peripheral subsystem by setting a flag in the data exchange logic. This then causes a Request-for-Service signal to be generated which starts the GDP interface logic acting. When the system accesses the Buffer-Bypass Register, the flag gets reset, indicating that the data was transferred.

Window Data Buffers

There is one window buffer allotted to Window 0. The buffer is composed of the following:
  A register fifo of 8 words of 16 bits
  Two fifo status flip-flops
  A stack of 9 words of 1 bit
  Input/output MUX logic
  Input/output status flags and logic
  Input/output high and low byte-swapping logic Data can be read or written 1 or 2 bytes at a time and both reading and writing can occur simultaneously. Data is always read off the top of the fifo, except in certain cases in which the least significant byte of the top-1 register is read. The location in the register fifo to be written into is selectively determined by the 9-word by 1-bit stack, one of the fifo status flip-flops (oddwrite flip-flop) and the input-byte-quantity input.

The 9-word, 1-bit wide stack contains a 1 in a field of 0 which points to the first 16-bit word in the fifo with an empty byte. The stack has zero fill on top and bottom, so push and pop operations on the stack serve to move the pointer up and down.

The oddwrite status flip-flop denotes whether the 16-bit word is completely empty (oddwrite=0) or if only the MSByte (most significant byte) is empty (oddwrite=1). Whenever a register is completely filled, the stack is pushed. Whenever both bytes in a register are read, the fifo and the stack are popped.

When writing, the input data is packed in a right-justified format automatically by the data buffers. For example, if the input-byte-quantity input indicates one-byte transfers, the first byte will be placed in the LSByte (least significant byte) of the first register and the next byte will be placed in the MSByte of the first register. The next location to be filled would be the LSByte of the next register, etc. When reading, the first byte accessed will be the LSByte, then the MSByte, then the LSByte of the next register, etc.

Likewise, if there is one byte in the buffer and then a double byte is written, the LSByte of the double-byte input data will be written into the MSByte position of the first register in the fifo and the MSByte of the double-byte input data will be written into the LSByte position of the second register.

Right-justified byte-packing is only required on the peripheral subsystem writes since 8800 side accesses are normally in right-justified format. The previously-shown cases have illustrated a couple of byte-packing cases. All of the byte-packing cases are shown in FIG. 8, Bytepacking Cases For Window Data Buffers.

In Cases 1 and 2, Oddwrite gets set equal to one and the pointer remains unchanged. In Case 3, Oddwrite remains the same (=0) but a push operation is performed on the stack to move the pointer to the next empty register. In Cases 4 and 5, Oddwrite gets set equal to zero and the stack is pushed. In Case 6, Oddwrite remains unchanged (=1) and the stack gets pushed. Cases 2, 4,5, and 6 do not apply to system side writing, since all writes are double byte except for the last byte of an odd byte quantity block transfer. The byte shifting performed in Cases 2, 4, and 6 is done by the byte-swapping logic for reads and writes on the peripheral subsystem side.

The previous descriptions have described the function of one of the fifo status flip-flops, Oddwrite, which indicates that an odd number of bytes has been written into the buffer. The other required status flip-flop is Oddread, which indicates that an odd number of bytes has been read out of the buffer.

In the case where the system reads the buffer, the Oddread flip-flop will always equal zero, since the system side always reads the buffer two bytes at a time except when one byte is left at the end of a block transfer. If the peripheral subsystem is reading the buffer, double-byte and single-byte accesses may be intermixed. FIG. 9, Window Data Buffer Read Cases, shows all possible cases of reading.

In Cases 1 and 2, Oddread gets set equal to one and the fifo and stack are not popped. In Case 3, Oddread is unchanged (=0) and the fifo and the stack are popped. In Cases 4 and 5, Oddread gets set equal to zero and the fifo and the stack get popped. In Case 6, Oddread remains unchanged (=1) and the fifo and stack are popped. Cases 7 and 8 are unique from the other cases and indicative of the buffer containing only one byte. There is a case where the buffer may contain only one byte, which is located in the MSByte position in the top register but this case is analogous to Cases 4 and 5. In Cases 7 and 8, when reading and writing are not simultaneous, Oddread remains unchanged (=0) and the fifo and stack get popped. In addition, Oddwrite gets set equal to zero since the buffer is then empty. However, in Cases 7 and 8 when a read and a write occur simultaneously, Oddwrite gets set equal to one and the stack is pushed, due to the write, since the MSByte of the top fifo register will get written into. Only Cases 3 and 7 apply to reads from the system side. All Cases 1 to 8 are applicable to peripheral subsystem reads.

The register fifo size is set at eight words of 16 bits wide. The 16-bit width allows easy accommodation of double-byte accesses in one clock cycle. The word depth is chosen to optimize the data rate. Eight words have been chosen to optimize for transfer of four double-byte packets to and from the GDP system. An example of this would be the case in which the peripheral subsystem was reading from the GDP system. Four double bytes could be loaded into the buffer for the peripheral subsystem to read, and while the peripheral subsystem is busy reading this, another four double-byte access could be requested. If the peripheral subsystem is busy and does not read any of the first packet, there needs to be enough buffer to store the second four-double-byte packet i.e., eight double bytes of buffer space. The stack requires nine bits of depth—one for each of the fifo's eight words and a ninth bit to indicate that the fifo is full.

The GDP Interface

Internal ACD (IACD) Bus. The IACD Bus (307) is a PH2 Precharge/PH1 Discharge Bus that carries address, control, and data to the ACD pins (309) and carries data from the ACD pins back into the microprocessor. Access on and off of the IACD Bus is controlled by the access sequencer (324) via the following signals (not shown):

| | |
|---|---|
| ENAL | Enable address low and control info onto the IACD Bus. |
| ENAH | Enable address high information onto the IACD Bus. |
| ENDAT.Write | Enable write data onto the IACD Bus. |
| ENDAT.Read.ISB | Enable read data from the pins off of the IACD Bus. |
| ENDAT.Write.ISB | Write data was accepted and new write data should be placed on the bus next time. |

GDP Address Development Logic. A GDP address is computed by adding a 16-bit displacement to a 24-bit base address. The following table shows the sources of the base and displacement for all kinds of accesses supported by the microprocessor:

| Kind of Access | Displacement | Base |
|---|---|---|
| Access Memory microinstruction | Displacement Register | Base-and-Length indexed by BBBB |
| Access Access List microinstruction | Upper 14 bits of Displacement Register | Base-and-Length indexed by lower 2 bits of displacement register |
| Local Access microinstruction | Displacement Register | Base-and-Length indexed by BBBB |
| PS Random Access | PS address-PS base from CAM | Base-and-Length indexed by 16 + matched window |
| PS Buffered Access | Write Counter | Base-and-Length indexed by 16 |

Figure 10:
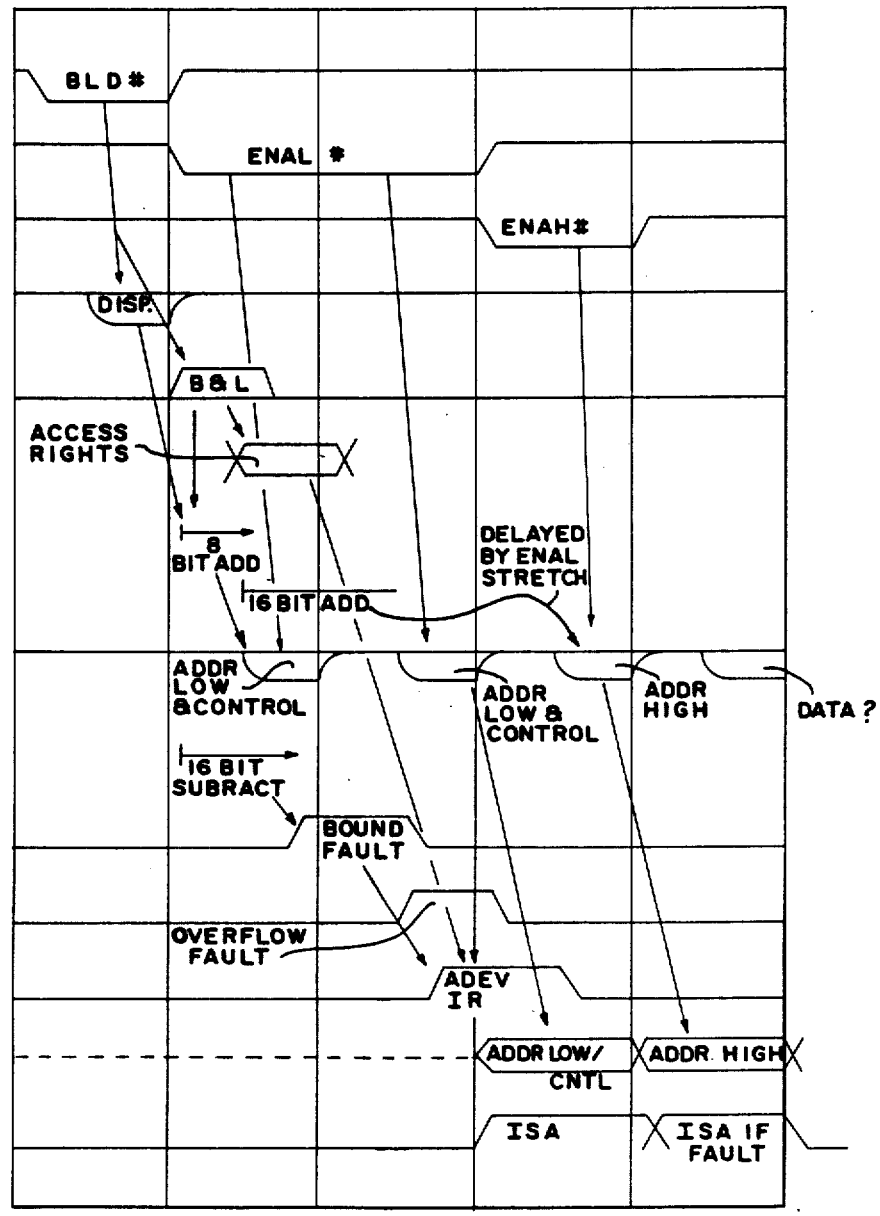
FIG. 10 is a timing diagram of the address development and fault timing of the microprocessor in which the invention is embodied.

FIG. 10, GDP Address Development & Fault Timing, shows the timing of the GDP address development. The rights checking logic (370) detects the following kinds of faults:

1. Bounds Fault. The displacement plus the access length (minus 1) is greater than the allowable length specified in the Base-and-Length Register (372).

2. Overflow. The base plus the displacement causes an overflow in the address adder (332), meaning that the physical upper bound of memory has been exceeded.

3. Write-Access Rights. An access attempts to do a write or a Read-Modify-Write when the Write Rights bit in the Base-and-Length Register (372) is zero.

4. Read-Access Rights. An access attempts to do a read or a Read-Modify-Write when the Read Rights bit in the Base-and-Length Register is zero.

Figure 11:
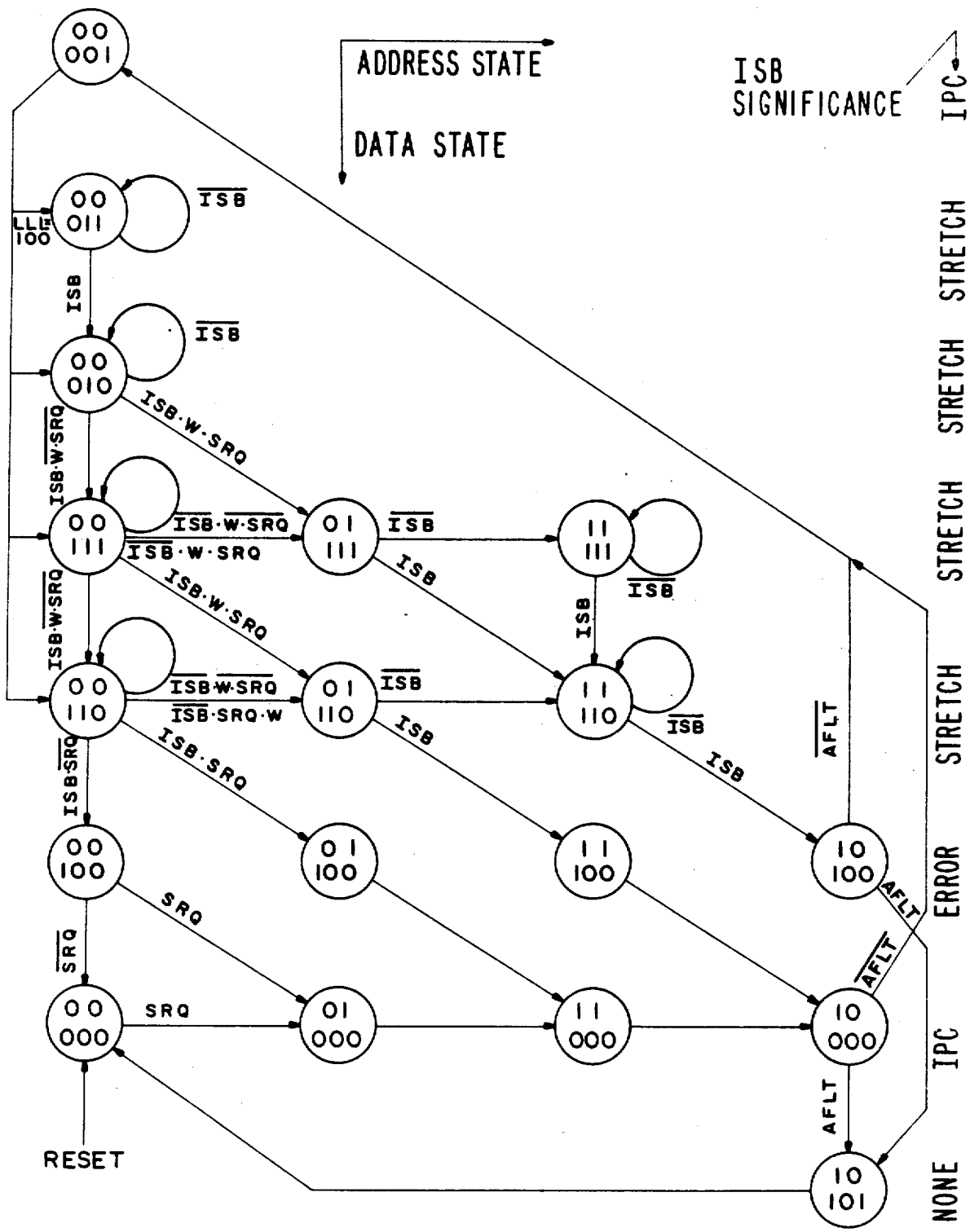
FIG. 11 is a state diagram of the access sequencer of the microprocessor in which the invention is embodied.

The Access Sequencer. The access sequencer (324) is a PLA-controlled state machine. The state variables are divided into two types: the address state and the data state. The address state determines the state of the address development activity and the data state determines the state of the data transmission activity. The two activities can overlap to some extent. Refer to FIG. 11, Microprocessor Access Sequencer State Diagram.

THE MICROEXECUTION UNIT (MEU)

The microexecution unit (MEU), FIG. 2a, is responsible for the sequencing and execution of the microcode. It uses three major internal buses: (1) the Microaddress Bus (MAB-337), (2) the Microinstruction Bus (MIB-340), and (3) the Main Data Bus (ABUS-339).

Pipeline

Refer to FIG. 3 "Microprocessor Internal Timing." The basic internal pipeline of the microexecution unit consists of the following cycles:

1. Interrupt request and interrupt grant. Microaddress computed.
2. Microcode ROM accessed.
3. Microinstruction decoded. Operands accessed. ACD inputs driven.
4. Data movements and ALU operations performed.
5. ACD output pins driven.

Microaddress Sequencer

The function of the Microaddress Sequencer is to provide addressing for the microinstruction ROM (306). It functionally centers around the Microaddress Bus (MAB-337) which transfers the microaddress to the microaddress register (380) from one of the seven possible sources: the Microaddress Register itself, the Incrementer (382), the Call Return Stack (384), the Fault-Link Stack (386), the Interrupt Vector ROM (394), the Absolute Address Drivers (bus 340), and Indirect Address ROM (OPROM-388). The Microaddress bus (337) is then buffered out through the Microaddress Register (uAR-380) to the ROM address drivers. The next sections describe some of the microaddress sources in greater detail.

Interrupt Control Logic (396). All microinstruction flows are initiated by the Interrupt Control Logic. The term interrupt used in this section refers to a request made by some logic circuit for a microcode flow to be started to service a fault or peculiar condition. The microcode flow may then perform a service for the requesting circuit, set status bits, or record error conditions.

Each interrupt has two flags associated with itself: the Interrupt-Pending Flag and the Interrupt-Active Flag. When an interrupt request is made, the interrupt-control logic records that request by setting the Interrupt-Pending Flag for that interrupt. When the microcode flow for that interrupt is started, then the Interrupt-Pending Flag is reset and the Interrupt-Active Flag is set. The Interrupt-Active Flag assures that no interrupts of lower priority will be started until the present interrupt service routine has finished. When the flow finishes, then the Interrupt-Active Flag is reset.

The interrupts are organized by a priority scheme. The table below shows how the microprocessor interrupts are organized:

| MICROPROCESSOR INTERRUPT STRUCTURE | | |
|---|---|---|
| Flag | Type of Interrupt | Return Status |
| 1 HERR Active | Hardware Error | Not Returnable |
| 2 HERR Pending | | |
| 3 BERR Active | Bus Error | Return by EI |
| 3 BERR Pending | | |
| 4 PCLK Active | PCLK Interrupt | Return by EI |
| 5 PCLK Pending | | |
| 6 ADEV Active | Address Development Fault | Not Returnable |
| 7 ADEV Pending | | |
| 8 FOF Active | Fault on Flag Fault | Not Returnable |
| 9 FOF Pending | | |
| 10 ALTD Active | Segment Altered Fault | Return by EI |
| 11 ALTD Pending | | |
| 12 FLOW Active | MAP, ALRM, CMND, or IPC Flow | |
| 13 MAP Pending | MAP Fault | Not Returnable |
| 14 ALRM# Pending | Alarm Pin Interrupt | Not Returnable |
| 15 CMND Pending | Command Request Interrupt | Return by EI |
| 16 INIT# Active | Initialization Flow is active | Not Returnable |
| 17 IPC Pending | Interprocessor Communication Interrupt | Not Returnable |

NOTE:
1 is highest priority; 17 is lowest priority.
BERR Active and BERR Pending are same priority.
MAP, ALRM, CMND, and IPC share a common Flow Active flag.
EI refers to End of Interrupt Microinstruction.

A pending interrupt will only become active and start a microcode flow if no higher priority pending or active flags are set. The interrupts marked Return by EI (End-of-Interrupt microinstruction) cause return microaddresses to be pushed on the Call-Return Stack (384) when their microcode service routines are started. These flows may all return by executing the End-of-Interrupt microinstruction which behaves like a return microinstruction except that it also clears the appropriate interrupt active flag. Nonreturnable interrupts can only have their interrupt active flags cleared by the Clear Errors or Reset Processor microinstructions. The Enter Active State microinstruction causes the Flow Active flag to be set.

UADDR REG (uAR-380), UADDR BUS (uAB-337) AND INCREMENTER (382)

The microaddress bus collects and transmits microaddresses to the uinstruction ROM. The microaddress bus includes the following circuits: the microaddress register, the microaddress incrementor, the call return stack, the fault link microaddress stack, the interrupt vector microaddress ROM, and the command vector microaddress ROM.

The microaddress register latches microaddress data from the microaddress bus or the interrupt vector ROM and drives the microaddress decoders of the uinstruction ROM. The microaddress incrementor computes the 11-bit UAR+1. The result is placed onto the microaddress bus.

Call-Return Stack (384). The Call-Return Stack stores return addresses for both microcode subroutines and certain interrupts. It can hold as many as ten return microaddresses. The Call-Microsubroutine microinsturction and a signal called PSHSTK created by the interrupt-control logic (396) cause the Call-Return Stack to push on a return microaddress. In the case of a call, the output of the incrementer (382), microaddress register plus one, is pushed onto the stack. In the case of interrupts, the microaddress register itself is pushed onto the stack. This is because interrupts have to break the pipeline in some respect by (1) forcing a NOOP over the microinstruction immediately preceding the interrupt-service routine, thereby keeping it from being executed; and (2) pushing the contents of the microinstruction register (which points to the microinstruction trounced on by the NOOP) instead of the output of the incrementer. The reason that the pipeline must be broken is as follows: if the microinstruction immediately preceding the interrupt microcode flow happened to be a branch microinstruction and that branch were allowed to take place, then the microaddress sequence would be as follows:

| | Microinstruction X |
|---|---|
| B | Branch to A (Interrupt to C) |
| B+1 | Microinstruction after Branch |
| C | First Interrupt Microinstruction |
| | . |
| | . |
| | End of Interrupt |
| | Microinstruction after End of Interrupt |
| B+2 | Next microinstruction in normal flow |

Notice that the branch did not take place. The way that this problem is corrected was described above. The microaddress sequence actually performed by the IP will be as follows:

| | Microinstruction X |
|---|---|
| B | Branch to A NOOP (Interrupt to C) |
| C | First Interrupt Microinstruction |
| | . |
| | . |
| | End of Interrupt |
| | Microinstruction after End of Interrupt |
| B+1 | Microinstruction after Branch |
| A | First microinstruction at branch location. |

Fault-Link Stack (386). The Fault-Link Stack is a six-level-deep stack which stores the address values pushed onto it by the Push-Fault Link microinstruction. Values are popped off the stack by one of two microinstructions: Pop Fault Link which simply pops off and discards the top entry on the stack, and Return from Fault which pops the top microaddress entry of the stack and branches to that location.

Indirect-Address ROM (OPROM-388). The Indirect-address ROM or OPROM (Opcode Starting-Address ROM) is used by the Branch-Indirect microinstruction. This novel microinstruction allows the microcode to

Microinstruction Drivers and Decoders

Microinstruction ROM (306). The Microinstruction ROM is a 2K-by-16-bit ROM (32K) containing all of the microcode flows used by the IP.

Figures 12, 13:
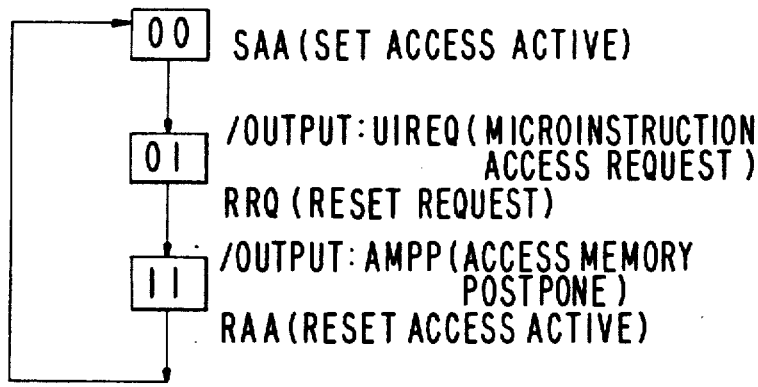
FIG. 12 is a flow diagram of the driver state machine.
FIG. 13 is a diagram of the contents of a base-and-length register.

Microinstruction Bus Drivers. There are two microinstruction bus drivers used on the microprocessor, designated the Upper Drivers (342) and the Lower Drivers (344). They are controlled by the Driver State (DS) logic. The flow diagram of the driver state machine (331, FIG. 2a) is shown in FIG. 12. The notation used is:

| | | |
|---|---|---|
| $SAA = (AM + AAL + LA).PH1$ | | AM = Access Memory microinstruction |
| | | AAL = Access Access List microinstruction |
| | | LA = Local Access |
| $RRQ = ENAL.UPR.PH1$ | | ENAL = Enable Address Low onto IACD Bus |
| | | UPR = Microinstruction priority access |
| $RAA = (XDONE + BUSERROR).UPRD.PH1$ | | XDONE = Transfer done |
| | | BUS ERROR = Bus error |
| | | UPRD = Microinstruction Priority Data | perform a sort of computed branch. The way the microinstruction operates is as follows:

1. The contents of a specified work register is placed on the ABUS
2. The lower-six bits of the ABUS are used to index into or address one of 64 microaddresses stored in the Indirect-Address ROM
3. The microaddress sequencer branches to the specified microaddress. This feature is very powerful and can be used as follows: Say you wanted to branch to microaddress A1 if the contents of a particular work register was 1; A2 if it was 2; A3 if it was 3; and A4 if it was 4. The number in the work register may be an opcode, or a fault code, or the result of a computation. The microaddresses A1, A2, A3, and A4 must have been previously programmed into masks of the Indirect-Branch ROM. In our example, let's say that the microaddresses A1, A2, A3, and A4 were programmed in locations 45, 46, 47, and 48, respectively. The microcode would first take the number in the work register and add a displacement to it. In this case the displacement would have to be 44. Then the microcode does a Branch Indirect via the result of the addition. In this example, if the original work register contained a 3, then the microcode would have branched to the microaddress contained in location 47 (3+44) of the Indirect-Branch ROM or microaddress A3.

Interrupt Vector ROM (394). The Interrupt Vector ROM contains the starting addresses of all of the interrupt service routines. The beginning microaddresses of the following interrupt service routines are provided:
Hardware Error
Bus Error
P-Clock Increment
P-Clock Clear
Address-Development Fault
Fault-on-Flag Fault
Segment-Altered Fault
Map Fault
Alarm# Interrupt
Command-Request Interrupt
IPC-Request Interrupt The lower driver disable to equal to the upper driver enable. The equation used was as follows:

$$UDREN = DISLDR = \#RESET.(UPR.UIW.\text{-}\\(ENAL + ENAH) + UPRD.ENDAT + UCODIN.\text{-}\\UID);$$

where
UPR = Microinstruction Priority access
UPRD = Microinstruction Priority data
UIW = Microinstruction Write bit
RESET = INIT# pin + HERR error
ENAL = Enable address low onto the IACD Bus
ENAH = Enable address high onto the IACD Bus
ENDAT = Enable data. High during ISB stretch significance
UCODIN = UIN pin asserted
UID = Microinstruction done.

The lower drivers (344) are used to latch and to drive the outputs of the Microinstruction ROM (306) onto the Microinstruction Bus (MIB-340). They are also used to store the last access-memory microinstruction for the purpose of executing the Execute-Last-Memory-Access-Microinstruction microinstruction. They are also used to force NOOPs onto the Microinstruction Bus. The following equations control the lower driver:

$$UID = \#(PP + ELMA)$$

$$NOP2UI = SI.UID + KILROY.\#UCODIN\\+ AMPP + FLTPP$$

$$LMA2UI + ELMA$$

$$i\ UIR2UI = \#PP$$

$$ROM2UI = UID.\#UCODIN$$

where
UID = Microinstruction done
PP = Postpone
ELMA = Execute-Last-Memory-Access microinstruction
NOP2UI = NOOP to microinstruction register LMA2UI = Last-Memory-Access microinstruction to microinstruction to Microinstruction Register
UIR2UI = Microinstruction Register to Microinstruction Register (Refresh)
ROM2UI = Microinstruction ROM to Microinstruction Register
SI = Start Interrupt
KILROY = KILROY pin asserted (a debug pin)
AMPP = Acess Memory Postpone
FLTPP = Fault Postpone The upper drivers are used to drive only two microinstructions: Interface-Register-to-Work-Register and Work-Register-to-Interface-Register. The SSSSS field for these two instructions comes from the SSSSS Counter (343) which is loaded by execution of Access Memory, Access-Access List, or Interconnect Access. These two microinstructions are forced during the execution of Access-Memory, Interconnect-Access, and Access-Access-List Microinstructions. During assertion of $UIN the upper drivers are also used to drive in microinstructions from the $AD pins for debug and testing purposes. On multiple-cycle microinstructions that are forced in, the upper drivers are used during the first cycle of the microinstruction and the lower drivers are used for all subsequent cycles. The upper driver is controlled by the following equations:

$$INC2UI = UDREN.(UPR.ENAH.UIW.(1=delay)-=ENDAT.ISB)$$

$$PSD2UI = UCODIN.UID$$

$$UDR2UI = \#(INC2UI = PSD2UI)$$

where
INC2UI = increment SSSSS counter
PSD2UI = PS data bus to upper drivers and SSSSS counter
UDR2UI = Refresh upper driver and SSSSS counter.

Microinstruction Bus (uIB-340). The microinstruction bus is used to carry control information (microinstructions) to all parts of the microprocessor. The bus is 42-bits wide: 16 bits of microinstruction and 16 bits of inverted microinstruction, 3 bits from the WWW register (or Window-Select Register) and 3 bits of its complement, PP (postpone) and PP#, and COND (condition and COND#. The complements are all needed for use in the decoders and PLA and-planes which decode the microinstruction bus.

The timing of the microinstruction bus is described as follows. The bus, which is implemented in metal, is foced to ground for a half-cycle (PH1), allowing all of the diffusion decode lines and PLA minterms to precharge. During the other half-cycle (PH2) the microinstruction bus is driven to its correct value, discharging all decode lines except those set-up to decode that particular microinstruction. All non-selected decode and and-plane terms must be discharged in a quarter cycle. PLA or-plane terms are precharged (PH1D) and discharged a quarter cycle later than PLA and-plane terms (PH2D).

If the microinstructin being presently decoded needs more cycles to complete, then the UIPP# (Microinstruction Postpone) line is asserted. This causes the lower drivers to latch the present microinstruction and force it on to the microinstruction bus again the next cycle. It also forces the PP# (postpone) signal with the microinstruction to let the machine now that the present microinstruction is in its second or more cycle of execution. The subsequent microinstruction will not be allowed onto the Microinstruction Bus until the present microinstruction releases the Microinstruction Bus by letting UIPP# go unasserted.

Data Movement and the ABUS (339)

The ABUS is the main internal data bus used in the microprocessor. Below is the list of all data structures that input to the ABUS.
1. The Fault Encoding from the output of the OPROM, bits 0-5 only (FE2A).
2. The TEMP C Register (TC2A).
3. The TEMP A Register (TA2A).
4. The TEMP B Register (TB2A).
5. The Work Register Sense Amps (REG2A).
6. The DBUS to ABUS Driver (D2A).
7. The Interface Register (IR2A).
8. The Base-and-Length Register Sense Amps (RI2A, LE23A, AL2A, AH2A).
9. Zero fill for entry state, bits 8-15 only (ZFILES).
10. The CROM (C2A).
11. The KROM (2A).
12. The WWW Register (WWW2A).
13. The Fault-Status Register (FSR2AL, FSR2AH).
14. The MAP Fault-Status Register (MSR2A).
15. The Bus Error 1 Register (BE1R2A).
16. The Bus Error 2 Register (BE2R2A).
17. The CAM Sense Amp (READ).
18. The Write Counter (WC2A).
19. The Block Counter (BK2A).
20. The Entry State Register 0, bits 0-7 only.
21. The Entry State Register 1, bits 0-7 only.
22. The Entry State Register 2, bits 0-7 only.
23. The Entry State Register 3, bits 0-7only.
24. The Entry State Register 4, bits 0-7only.
25. The Read Counter (RCORD).
26. The Window Fault-Status Register (WFRS).

Below is the list of all data structures that the ABUS inputs to:
1. The Address Drivers of the OPROM.
2. The TEMP C Register (A2TC).
3. The TEMP C Register to the left (SH@L).
4. The TEMP C Register to the right (SH@R).
5. The input of the ALU.
6. The TEMP A Register (A2TA).
7. The TEMP B Register (A2TB).
8. The Work Register Input Drivers (A2REG).
9. The Displacement Register (A2DR).
10. The Interface Register (A2IR).
11. The Base-and-Length Register Input Drivers (A2RI, A2LE, A2AL, A2AH).
12. The WWW Register (A2WWW).
13. The Fault-Status Register (A2FSR).
14. The MAP Fault-Status Register (A2MSR).
15. The Bus Error 1 Register (A2BE1R).
16. The Bus Error 2 Register (A2BE2R).
17. The CAM Input Driver (WRITE).
18. The Write Counter (WCR).
19. The Block Counter (BKR).
20. The Entry State Register 0, bits 0-7 only.
21. The Entry State Register 1, bits 0-7 only.
22. The Entry State Register 2, bits 0 -7 only.
23. The Entry State Register 3, bits 0-7 only.
24. The Entry State Register 4, bits 0-7 only.
25. The Read Counter (RCOWR).
26. The Context Status Register, bits 0-2 only (LCSL).

IP Data Structures

This section describes on each of the major structures (registers, ROMs, RAMs, etc.).

ALU (400). The ALU performs all the arithmetic and logical operations between work registers.

The logic unit portion of the ALU is controlled by four signals called L0, L1, L2, and L3. It performs the following operation for two bit inputs A and B:

L0.#A.#B+L1.#A.B+L2.A.#B+L3.A.B

The arithmetic portion of the ALU uses the logic unit portion to perform the Add, Subtract, Increment, Decrement, and Test Segment Type (performs a compare) microinstructions.

The ALU is controlled by the ALU PLA (402). The ALU PLA receives its inputs from the Register Control PLA (404), the microinstruction bus (340), and the carry flag (406). The following is the list of inputs to the ALU PLA.

| SIGNAL | SOURCE | DESCRIPTION |
|---|---|---|
| ARI | Reg.Contl.PLA | Asserted during arithmetic operations |
| LOG | Reg.Contl.PLA | Asserted during logical operations |
| INC | Reg.Contl.PLA | Asserted during Increments and Decrements |
| SUB | Reg.Contl.PLA | Asserted during Subtracts and Decrements |
| @LLLL | MIB | Differentiates types of logical operations |
| @T | MIB | Asserted by Add with Carry and Subtract with Borrow |
| Carry Out | Carry Flag | Carry Overflow Flag set by arithmetic operation |

The signals ARI, LOG, INC, and SUB tell what kind of operation is to be performed:

| A R I | L O G | I N C | S U B | Kind of operation to be done |
|---|---|---|---|---|
| 0 | 0 | — | — | No operation. In this case the ALU passes the ABUS directly through to the Temporaries. |
| 0 | 1 | — | — | Logical operations such as OR, AND, XOR, ANDNOT, etc. |
| 1 | — | 0 | 0 | Addition |
| 1 | — | 0 | 1 | Subtraction |
| 1 | — | 1 | 0 | Increment |
| 1 | — | 1 | 1 | Decrement |

The @L0, @L1, @L2, and @L3 signals tell what logical operation is to be performed:

| @L3 | @L2 | @L1 | @L0 | Kind of logic operation to be done |
|---|---|---|---|---|
| 0 | 0 | 0 | 0 | Not used |
| 0 | 0 | 0 | 1 | #A.#B |
| 0 | 0 | 1 | 0 | #A.B |
| 0 | 0 | 1 | 1 | Not used |
| 0 | 1 | 0 | 0 | A.#B |
| 0 | 1 | 0 | 1 | #A |
| 0 | 1 | 1 | 0 | A.#B + #A.B (XOR) |
| 0 | 1 | 1 | 1 | #A + #B (XOR) |
| 1 | 0 | 0 | 0 | A.B |
| 1 | 0 | 0 | 1 | A.B + #A.#B (XNOR) |
| 1 | 0 | 1 | 0 | Not used |
| 1 | 0 | 1 | 1 | A + #B |
| 1 | 1 | 1 | 0 | A + B |
| 1 | 1 | 1 | 1 | Not used |

The @T bit is used with Add and Subtract microinstructions to mean Add with Carry and Subtract with Borrow, respectively. The Cyout input is the carry out of the last stage of the ALU latched after the last arithmetic microprocessor that had TEMP B as its destination. The outputs of the ALU PLA are simply the LLLL lines which control the Logic Unit and the carry into the first stage of the ALU. The ALU PLA is coded as follows:

| ARI | LOG | INC | SUB | Cyout | @T | Cyin | L3 | L2 | L1 | L0 | |
|---|---|---|---|---|---|---|---|---|---|---|---|
| 0 | 0 | — | — | — | — | 0 | 1 | 0 | 1 | 0 | Idle, no operation (pass ABUS) |
| 0 | 1 | — | — | — | — | 0 | L | L | L | L | Logical operation (pass @LLLL field) |
| 1 | — | 0 | 0 | — | — | 0 | 0 | 1 | 1 | 0 | Add (propagate = A XOR B) |
| 1 | — | 1 | 0 | — | — | 1 | 1 | 0 | 1 | 0 | Increment (propagate = A) |
| 1 | — | 1 | 1 | — | — | 0 | 0 | 1 | 0 | 1 | Decrement (propagate = #A) |

These lines control Carry In for Adds and Subtracts:

| | | | | | | | | | | |
|---|---|---|---|---|---|---|---|---|---|---|
| — | — | 0 | 0 | 0 | 0 | 0 | 0 | 0 | 0 | Add - no Carry Out |
| — | — | 0 | 0 | 0 | 1 | 0 | 0 | 0 | 0 | Add - no Carry Out |
| — | — | 0 | 0 | 1 | 0 | 0 | 0 | 0 | 0 | Add - Carry Out, but no T |
| — | — | 0 | 0 | 1 | 1 | 1 | 0 | 0 | 0 | Sub - Borrow Out but no T |
| — | — | 0 | 1 | 0 | 1 | 0 | 0 | 0 | 0 | Sub - Borrow Out and T |
| — | — | 0 | 1 | 1 | 0 | 1 | 0 | 0 | 0 | Sub - no Borrow Out |
| — | — | 0 | 1 | 1 | 1 | 0 | 0 | 0 | 0 | Sub - no Borrow Out |

The above eight lines logically reduce to:

| | | | | | | | | | | |
|---|---|---|---|---|---|---|---|---|---|---|
| — | — | 0 | 1 | — | 0 | 1 | 0 | 0 | 0 | Sub - no T |
| — | — | 0 | — | 1 | 1 | 1 | 0 | 0 | 0 | T and Carry (no borrow) Out |

The Generate-and-Propagate Equations are as follows:

| Add - | G = A.B, | P + A.#B + #A.B |
|---|---|---|
| Sub - | G = A.#B, | P = A.B + #A.#B |
| Inc - | G = O, | P = A |
| Dec - | G = A, | P = #A |

Shift Logic (408). The microprocessor supports the Shift-Register-by-NNNN-Places microinstruction by loading the indicated work register into the TEMP C (410) register and rotating it one place at a time until the instruction is accomplished. The TEMP C register uses the two control signals, Shift Left (SH@L) and Shift Right (SH@R), which are driven by the shift control logic to control its shifting operations. Below is a table of the meaning of the NNNN field:

| NNNN | Shift Left | Shift Right |
|------|------------|-------------|
| 0000 | 0 | 0 |
| 0001 | 15 | 1 |
| 0010 | 14 | 2 |
| 0011 | 13 | 3 |
| 0100 | 12 | 4 |
| 0101 | 11 | 5 |
| 0110 | 10 | 6 |
| 0111 | 9 | 7 |
| 1000 | 1 | 15 |
| 1001 | 2 | 14 |
| 1010 | 3 | 13 |
| 1011 | 4 | 12 |
| 1100 | 5 | 11 |
| 1101 | 6 | 10 |
| 1110 | 7 | 9 |
| 1111 | 8 | 8 |

Work Registers. The 32 work registers are general-purpose registers used by the microcode. They are addressed by the SSSSS microinstruction field. The first 16 registers can be addressed by the RRRR field, also. Furthermore, Registers 14 and 15, TEMP A (412) and TEMP B (414), respectively, can also be addressed by the D-bit (used for specifying a destination in ALU operations).

The hardware recognizes five special-purpose work registers: Registers 14 and 15 are TEMP A and TEMP B, Register 0 is the Displacement Register, Register 27 is the Context Status Register, and Register 26 is the Fault Register. The microcode sets apart other registers for special purposes, but they are no different then the other work registers as far as the hardware is concerned.

All of the registers with the exception of TEMP A and TEMP B may be implemented in an INTEL 2147 RAM Cell Array. The two temporaries are built as L-latches with the ALU circuit. The Displacement Register exists in two places: first, it is in the RAM array (414) with all of the other work registers and a second copy is kept with the address development circuit. When the Displacement Register is read, the copy in the RAM array is put onto the ABUS. When the Displacement Register is written, then both copies are written into. The Context-Status Register also has two copies, except the second copy is of the first three bits only. These bits are used in the Peripheral Subsystem Timing Circuits. This register is read and written just like the Displacement Register.

System and Process Timers. Work registers 30 and 31 are set aside in the microcode for use as the System and Process Timers. When the PCKL# pin is asserted low for one clock cycle, the interrupt control logic forces an interrupt to the P-clock Increment service routine. This routine increments the System Timer and if the Timer Enable Flag is set, then it decrements the Process Timer and branches to the process timeout procedure if the Process Timer is zero. The Timer Enable Flag mentioned is kept by the microcode and there is no hardware to support it. When PCLK# pin is asserted for two or more cycles, then the interrupt control logic forces an interrupt to the P-clock Clear Service routine. This routine clears the two timers.

Register Transfer Control Signal Operation. The Register Transfer Control Signals are driven by the Register Control PLA (404). They control the transfer of register contents onto and off of the ABUS. The Register Control Signals are as follows:

| | |
|---|---|
| ES# | Enable the work register addressed by the SSSSS field. |
| ER# | Enable the work register addressed by the RRRR field. |
| EC# | Enable the CROM addressed by the CCCCC field. |
| ED# | Enable Temp A or Temp B as specified by the D field. |
| ET# | Enable Temp C. |
| WRW# | Specified the direction of a transfer. |
| | 0 - The work register is written into. |
| | 1 - The work register is read. |

The above truth table describes the interactions between the above control signals. ES# represents ES#, ER#, and EC#, and likewise (SSSSS) represents (SSSSS), (RRRR), and (CCCCC), respectively.

| ES# | ED# | ET# | WRW# | Action |
|-----|-----|-----|------|--------|
| 0 | 0 | 0 | 0 | Temp C to ABUS, ABUS to (SSSSS), ABUS to (D) |
| 0 | 0 | 0 | 1 | (SSSSS) to ABUS, ABUS to Temp C, ABUS to (D) |
| 0 | 0 | 1 | 0 | ????? to ABUS, ABUS to (SSSSS), ABUS to (D) |
| 0 | 0 | 1 | 1 | (SSSSS) to ABUS, ABUS to (D) |
| 0 | 1 | 0 | 0 | Temp C to ABUS, ABUS to (SSSSS) |
| 0 | 1 | 0 | 1 | (SSSSS) to ABUS, ABUS to Temp C |
| 0 | 1 | 1 | 0 | ????? to ABUS, ABUS to (SSSSS) |
| 0 | 1 | 1 | 1 | (SSSSS) to ABUS, ABUS to ????? |
| 1 | 0 | 0 | 0 | TEMP C to ABUS, ABUS to (D) |
| 1 | 0 | 0 | 1 | ????? to ABUS, ABUS to (D), ABUS to Temp C |
| 1 | 0 | 1 | 0 | ????? to ABUS, ABUS to (D) |
| 1 | 0 | 1 | 1 | ????? to ABUS, ABUS to (D) |
| 1 | 1 | 0 | 0 | Temp C to ABUS, ABUS to ????? |
| 1 | 1 | 0 | 1 | ????? to ABUS, ABUS to Temp C |
| 1 | 1 | 1 | 0 | No action |
| 1 | 1 | 1 | 1 | No action |

CROM (416). The CROM is a 32 by 16 bit ROM addressed by the CCCC microinstruction field. It contains predefined constants useful in microcode. It is implemented as an OR-plane off of the microinstruction bus.

KROM (418). The KROM is a data path from the Microinstruction Bus to the ABUS. It is used for copying the EEEEEE and KKKKKKKK fields and the Condition Flag (COND) onto the ABUS.

WWW Register (Map-Entry-Select Register-420). The WWW Register is used to point to one of the five windows during accesses to the Map Entry (window) Registers. It can be written from and read into any one of the work registers via the ABUS. The WWW Register is driven as part of the Microinstruction Bus and decoded in parallel with the microinstructions.

Base-and-Length-Register Array (372). The base-and-Length Registers provide information necessary to access GDP memory segments. There are 20 base-and-length registers on the microprocessor. Five of those are used for the five windows. Window 0 uses Base-and Length Register 16, Window 1 uses Base-and Length Register 17, and so on. Each base-and-length register has the information and formats shown in FIG. 13.

These formats are used by the microcode when transferring base-and-length information back and forth between the work registers and the base-and-length registers.

Address low, together with address high, make up the 24-bit base bus. The Base Bus goes to the Address Adder to be added to the displacement to become a GDP physical address. Read Rights, Write Rights, and the Altered Bit go to the Rights Checking logic. The Length Bits become the Length Bus and go to the Length Verification Circuit (373).

The Base-and-Length Register Array also has a temporary register which may be used for both tranfers from one base-and-length register to another. It supports the two microinstructions. Move Base-and-Length Register to Temp, and Move Temp to Base-and-Length Register.

It is possible that the MEU and the DAU could make a request for the Base-and-Length Register at the same time. If this occurs, then the DAU is given priority and the MEU is postponed via the Base-and-Length Postpone (BLPP) signal. As soom as the DAU is finished, then the MEU is allowed to continue.

Displacement Register (375). The Displacement Register has already been discussed in connection with the work registers, of which the Displacement Register is one. The contents of the Displacement Register are used as the segment displacement for the Access Memory and Interconnect Access microinstructions. In the execution of these microinstructions, the contents of the Displacement Register are placed on the DBUS which goes to the address adder.

Interface Register. The interface Register (334) is between the ABUS and the IACD buses. It buffers data going to and coming from the ACD pins. It is used by the Access-Interface-Register microinstruction which is forced from the upper drivers during the execution of the Access-Memory, Access-Access-List, and Interconnect-Access microinstructions.

Fault Registers. The microprocessor supplies the microcode with a lot of information connected with faulting. Five registers have been designed for this purpose. They are set by the hardware in response to fault conditions, and read and reset by the microcode during fault-service routines. The contents of the five registers are shown in FIGS. 14–17.

Specification Register. When an Access-Memory, Access-Access-List, or Interconnect-Access microinstruction is executed, then the following information is latched into the specification register: three bits to specify what kind of access it was, the BBBB field, the LLL field, the W bit, and the M bit. This information is used by the access sequencer (324) when it computes a GDP address-and-control word for a microinstruction access to the GDP.

Map-Facility Registers. The Map Facility Registers are used to configure the five windows. They include the following: the read count (359), the block count (343), the write count (358), the base registers (372), the mask registers, and the entry state registers (351) of the five windows. These registers can be read and written by the microexecution unit. However, if they are written into, then the microprocessor first requests and obtains a PS-Bus hold to prevent the peripheral subsystem (PS) processor from using any of the windows while they are being altered.

DBUS-to-ABUS Drivers. These drivers provide a data path between the DBUS and the ABUS in order to support the Move-Displacement-to-Register microinstruction. This microinstruction is used primarily in the Map-Fault-Service routine to determine what the PS displacement was after the fault.

SUMMARY OF MICROPROCESSOR OPERATION

The microprocessor appears to the remainder of the system as an object oriented data processor similar to a General Data Processor (GDP), and is capable of manipulating the GDP environment in much the same way as a GDP data processor. The microprocessor also provides operators whereby the attached processor, which is part of the peripheral subsystem, can control the address-mapping function. This includes map initialization and selecting data segments.

The microprocessor receives addresses and data from the peripheral subsystem over a bus (310). Each of the addresses is used to interrogate an associative memory (300) to determine if the address falls within one of the subranges for a "window" on the GDP main memory address space. If the address matches, then the address is used to develop a corresponding address on the main memory address space. The data associated with the peripheral subsystem address is then passed over the interface and into the main memory at the translated memory address. When the main memory responds, indicating that it has received the data, interface logic signals the peripheral subsystem for the next item of data.

Data transfer is improved by buffering blocks of data in a buffer (350) on the microprocessor, to thereby avoid this lengthy sequence of operations for each piece of data. Logic and clocking mechanisms allow the peripheral subsystem to write data into the buffer at a slower rate than the data is read out of the buffer and into the main memory. Thus, several bytes of data may be written into the buffer at a slow rate, whereas a block of data may be written out of the buffer at a high data rate. Single bytes of data may be transferred to a single address by bypassing the buffer. This is accomplished by providing a buffer bypass register (355) and allowing the microprocessor to operate in two modes, a random-access mode wherein the buffer is bypassed, and a block-transfer mode wherein the buffer is utilized. Address development and memory response signals are generated by the microprocessor, rather than the peripheral subsystem processor, for block transfers when the microprocessor is in the buffered mode.

In a typical input/output operation, the peripheral subsystem address subranges to be mapped are set up by the attached processor software through operators made available through the function-request facility. The association between address subranges and GDP data segments in main memory are also set-up by the attached processor software.

The command register (312) provides for the implementation of a one-at-a-time command interface. The attached processor utilizes this interface by writing a bit pattern into the command register. This bit pattern is a command to the microprocessor to execute an operator, for example, a wait-to-receive-a-message operator. The microprocessor uses the information in the command register to find the appropriate buffered port in the GDP by means of the access information written in the context object associated with the microprocessor. Upon locating the communication port, the microprocessor will find an IO request message put there previously by a GDP process.

The microprocessor places the access descriptor for the message into the context object for the IO process. The microprocessor then signals completion by posting status in a set of registers provided for that purpose at the command interface, or by interrupting the attached processor through an interrupt mechanism.

The attached processor software receives the message at the time it responds to the interrupt or upon testing the status registers. In response to this message and the information contained therein, the attached processor software sets up the mapping facility and controls the transfer of data (a read or write) as requested in the message. The attached processor issues addresses on its local bus. These addresses are recognized by the microprocessor. Those addresses which fall within a predetermined subrange are mapped into GDP main memory by means of the mapper (302) in the microprocessor.

After transferring all of the data associated with the addresses specified in the message, the software on the attached processor composes a completion message to be sent to the requesting GDP process. The attached processor signals the GDP process by writing a bit pattern into the command register (312). This pattern represents a request that the information be sent back to a specified communication port through the interprocess communication mechanism. The attached processor software is now free to return to the instruction code that requests another message, the wait-for-message operator. The operation just described is then repeated.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. For use with a peripheral subsystem having a peripheral subsystem bus, and a data processor containing a main memory connected to a main memory bus (ACD bus), a microprocessor for mapping a portion of a peripheral address space into a portion of a main memory address space over said ACD bus, the combination comprising:

first means receiving addresses and commands from said peripheral subsystem, said first means including a plurality of registers, connected to said peripheral subsystem bus for providing address windows, one of said registers (a command register) being dedicated to receiving commands over said peripheral subsystem bus, said first means further including means for translating addresses within a certain subrange into memory references of one or more main memory data segments, each memory reference having a corresponding translated memory address;

means connected to said command register for decoding said commands into decoded signals;

selecting means responsive to said decoding means for selecting a random mode or a buffered mode;

a multibyte data buffer connected to said peripheral subsystem bus and to said ACD bus, for receiving data from said peripheral subsystem bus for transmission to said main memory over said ACD bus;

a buffer bypass register connected to bypass said data buffer; and bypass control means responsive to said selecting means for routing data from said peripheral subsystem bus to said ACD bus through said data buffer or through said bypass register dependent upon the state of said selecting means.

2. For use with a peripheral subsystem having a peripheral subsystem bus, and a data processor containing a main memory connected to a main memory bus (ACD bus), a microprocessor for mapping a portion of a peripheral address space into a portion of a main memory address space over said ACD bus, the combination comprising:

first means connected to said ACD bus, said first means including means for translating addresses within a certain subrange into memory references of one or more main memory data segments, each memory reference having a corresponding translated memory address, said first means further including command decoding means for decoding commands into decoded command signals;

second means connected to said address translating means and to said peripheral subsystem bus for receiving addresses and commands over said peripheral subsystem bus and for transmitting addresses and commands to said first means, said second means including means for transmitting ready and acknowledge signals over said peripheral subsystem bus;

a multiword buffer;

a single-word buffer bypass register connected to said peripheral subsystem bus and to said ACD bus;

first logic means connected to said multiword buffer and to said peripheral subsystem bus for moving data from said peripheral subsystem bus and into said multiword buffer;

second logic means connected to said multiword buffer and to said ACD bus for moving data out of said buffer and onto said ACD bus; and, mode selection means, connected to said multiword buffer, said buffer bypass register, said first means, and said first logic means, responsive to said decoded command signals for selecting a random-access first mode and a buffered second mode, said mode selection means including means operative when in said first mode for transferring data to said buffer bypass register so that addresses may be developed immediately by said translating means, and whereby said second means may respond with ready and acknowledge signals for each data transfer, and said mode selection means further including means operative when in said buffered second mode for transferring data to said buffer wherein said data may be accumulated for subsequent block transfers, and wherein said first and second means may receive a first address and develop subsequent addresses for subsequent data transfers to said main memory, said second means being capable of responding with ready and acknowledge signals to said peripheral subsystem upon completion of said block transfer.

3. The combination in accordance with claim 1 or claim 2 wherein said first means further comprises:

an associative memory responsive to said addresses received over said peripheral subsystem bus, wherein each of said addresses interrogates said associative memory to determine if one address of said addresses falls within one of said subranges for a window on said main memory address space;

whereby if said one address matches, then said one address may be used to develop a corresponding translated address on said main memory address space.

4. The combination in accordance with claim 1 or claim 2 further comprising:

interface logic connected to said first means and to said ACD bus for passing data associated with said one address through said interface logic and into said main memory at said translated memory address.

5. The combination in accordance with claim 2 wherein said first logic means includes:

third means for allowing said peripheral subsystem to write data into said buffer at a slower rate than the data is read out of said buffer and into said main memory;

whereby several bytes of data may be written into said buffer at a slow rate, and a block of data may be read out of said buffer at a high rate.

6. The combination in accordance with claim 1 further comprising:

second means connected to said address translating means and to said peripheral subsystem bus for receiving addresses and commands from said peripheral subsystem and for transmitting said addresses and commands to said first means, said second means including means for responding to said peripheral subsystem with ready and acknowledge signals;

said second means further including means for generating said ready and acknowledge signals for block transfers when said microprocessor is in said buffered mode.

7. The combination in accordance with claim 1 or claim 2 wherein said first means further comprises:

a plurality of recognizers responsive to addresses received over said peripheral subsystem bus, wherein each of said addresses interrogates said plurality of recognizers to determine if one address of said addresses falls within one of said subranges for a window on said main memory address space;

whereby if said one address matches, then said one address may be used to develop a corresponding translated address on said main memory address space.

8. The combination in accordance with claim 1 or claim 2 wherein said first means further comprises:

a plurality of recognizers responsive to addresses received over said peripheral subsystem bus, wherein each of said addresses interrogates said recognizers to determine if one address of said addresses falls within one of said subranges for a window on said main memory address space;

an autoincrement counter connected to said plurality of recognizers;

each of said recognizers having a register with a base address stored therein, which base address points to the base of a main memory data segment, whereby when a match is received from a particular one of said recognizers, said base address of said particular one of said recognizers is added to a displacement which said recognizer computes from either said peripheral subsystem bus address or said autoincrement counter.

9. The combination in accordance with claim 7 further comprising:

means in at least one recognizer of said plurality of recognizers whereby said one recognizer can be set to function in one of three modes:

random mode, which allows an external device to read or write single bytes or double bytes at random through said window, pin-hole mode, which allows an external device to sequentially access memory at one specific address for a predetermined number of accesses, and swept mode, which allows an external device to access memory with sequential addresses for a predetermined count.

10. The combination in accordance with claim 1 further comprising:

a microprocessor execution unit connected to said periheral subsystem bus for executing a subset of instructions;

said subset including those instructions necessary for an attached peripheral subsystem processor to be able to control buffers and execute its tasks; and, wherein said one of said registers is adapted to store status information for transfer over said peripheral subsystem bus whereby said attached processor is able to make requests by storing a copy of the desired instruction in said command register, completion of said instruction being signaled in said status register.

11. The combination in accordance with claim 3 wherein:

each of said address subranges has a corresponding register in said associative memory with a base address stored therein, which base address points to the base of a main memory data segment, the base register specifies the address of the window base in said peripheral subsystem address space;

a mask register for storing the length of the window in said peripheral subsystem address space;

said associative memory further including means connected to said mask register and said base register for comparing a first portion of said peripheral subsystem address to the contents of said base register to determine a window match where said mask is set to 1s;

a second portion of said peripheral subsystem address being used as a displacement into said segment in random and interconnect type accesses.

12. For use in combination with a generalized data processor (GDP) system including a GDP system memory, and a GDP system bus (309) connected to said GDP memory; and a peripheral subsystem having a peripheral subsystem storage having a peripheral subsystem storage, and a peripheral subsystem bus (310, 311, 313) connected to said peripheral subsystem storage, a microprocessor comprising:

a microinstruction bus (340);

a microexecution unit (MEU) including a microinstruction bus lower driver (344);

a data acquisition unit (DAU) including a microinstruction bus upper driver (342);

said MEU and said DAU being connected together by means of said microinstruction bus, said microinstruction bus being connected to said microinstruction bus upper driver (342) in said DAU and said microinstruction bus lower driver (344) in said MEU;

first means (314, 316, 317, 319) for connecting said DAU to said peripheral subsystem bus;

second means (332, 334, 336, 338) for connecting said DAU to said GDP system bus; and, third means (330) for connecting said MEU to said GDP system bus;

said DAU including memory access path means connected to said first and second means;

said memory access path means including fourth means for receiving addresses and commands placed on said peripheral subsystem bus, said fourth means including an address register (314) for latching an address received over said peripheral subsystem bus a data register (316) for latching data received over said peripheral subsystem bus, said data latch being connected to said upper driver (342);

said MEU including execution means (304) connected to said microinstruction bus (340) for executing operators contained in said commands, to perform operations requested by said peripheral subsystem and including control means connected to said third means (330) for responding to messages received from said GDP system over said GDP system bus, said DAU further including recognizing means (300) connected to said address register (314) for comparing an address in said address register (314) with the contents of a plurality of window registers in said recognizing means, said recognizing means including means for generating a match signal (301) upon the condition that said address in said address register (314) matches one of a plurality of nonoverlapping address ranges stored in said recognizing means, said address ranges corresponding to address ranges in the address space of said peripheral subsystem, said address ranges (windows) defining segments in said peripheral subsystem address space whereby said peripheral subsystem can access through said DAU to said GDP system memory;

said execution means in said MEU including means (343, 351, 358, 359, 372) for configuring said memory access path means in said DAU such that said windows can be set-up, modified, turned off, turned on, or moved in said subsystem address space by said MEU in response to commands received by said peripheral subsystem through said command register in said DAU.

13. The combination in accordance with claim 12 wherein:

a first one of said window registers can be set-up to allow accesses to interconnect-address space of said system, a second one of said window registers is dedicated as the data-control register, and a third one of said window registers is a hardware-recognized displacement that causes an interrupt to the MEU signifying that said peripheral subsystem requested said MEU to execute a macroinstruction.

14. The combination in accordance with claim 8 further comprising:

means in at least one recognizer of said plurality of recognizers whereby said one recognizer can be set to function in one of three modes:

random mode, which allows an external device to read or write single bytes or double bytes at random through said window, pin-hole mode, which allows an external device to sequentially access memory at one specific address for a predetermined number of accesses, and, swept mode, which allows an external device to access memory with sequential addresses for a predetermined count.

* * * * *